(12) United States Patent
Sun et al.

(10) Patent No.: US 9,564,754 B2
(45) Date of Patent: Feb. 7, 2017

(54) ENERGY ROUTER FOR ENERGY INTERNET

(71) Applicant: Northeastern University, Shenyang, Liaoning Province (CN)

(72) Inventors: Qiuye Sun, Shenyang (CN); Huaguang Zhang, Shenyang (CN); Dazhong Ma, Shenyang (CN); Bonan Huang, Shenyang (CN); Lei Chen, Shenyang (CN); Heng Du, Shenyang (CN); Zhenwei Liu, Shenyang (CN); Fei Teng, Shenyang (CN); Guotao Hui, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 113 days.

(21) Appl. No.: 14/717,823

(22) Filed: May 20, 2015

(65) Prior Publication Data
US 2016/0241137 A1    Aug. 18, 2016

(30) Foreign Application Priority Data
Feb. 16, 2015    (CN) .......................... 2015 1 0082066

(51) Int. Cl.
*H02J 1/00* (2006.01)
*H02J 5/00* (2016.01)
(Continued)

(52) U.S. Cl.
CPC .. *H02J 1/00* (2013.01); *H02J 5/00* (2013.01); *H02M 3/285* (2013.01); *H02M 3/337* (2013.01);
(Continued)

(58) Field of Classification Search
CPC ............. H02J 1/00; H02J 5/00; H02M 3/285; H02M 7/219; H02M 7/797; H02M 3/337; H02M 2001/007
(Continued)

(56) References Cited

U.S. PATENT DOCUMENTS

| | | | |
|---|---|---|---|
| 6,919,664 B2* | 7/2005 | Leijon | H01F 3/10 174/DIG. 19 |
| 8,068,355 B1* | 11/2011 | Ikriannikov | H02M 3/285 323/222 |
| 2013/0020869 A1* | 1/2013 | Wallmeier | H02M 5/16 307/18 |

* cited by examiner

*Primary Examiner* — Jared Fureman
*Assistant Examiner* — Michael Warmflash
(74) *Attorney, Agent, or Firm* — Muncy, Geissler, Olds & Lowe, P.C.

(57) ABSTRACT

The present invention relates to an energy router for an energy internet, which comprises a three-phase three-level bi-directional rectifying unit, a six-phase interleaved DC/DC bi-directional conversion unit, a self-excitation soft start push-pull full-bridge DC/DC bi-directional conversion unit, a three-phase resonant soft switching bi-directional inversion unit, a single-phase full-bridge bi-directional inversion unit, a high-voltage DC bus and a low-voltage DC bus. The three-phase three-level bi-directional rectifying unit, the six-phase interleaved DC/DC bi-directional conversion unit, the self-excitation soft start push-pull full-bridge DC/DC bi-directional conversion unit, the three-phase resonant soft switching bi-directional inversion unit and the single-phase full-bridge bi-directional inversion unit each have three energy flow operating modes: a forward conduction, a reverse conduction and a non-conduction. According to the energy flow operating mode of each unit, different operating modes of the energy router for the energy internet are formed.

5 Claims, 14 Drawing Sheets

(51) Int. Cl.
  *H02M 3/28* (2006.01)
  *H02M 3/337* (2006.01)
  *H02M 7/219* (2006.01)
  *H02M 7/797* (2006.01)
  *H02M 1/00* (2006.01)

(52) U.S. Cl.
  CPC ............. *H02M 7/219* (2013.01); *H02M 7/797* (2013.01); *H02M 2001/007* (2013.01)

(58) Field of Classification Search
  USPC .......................................................... 307/31
  See application file for complete search history.

US 9,564,754 B2

ENERGY ROUTER FOR ENERGY INTERNET

CROSS-REFERENCE TO RELATED APPLICATION

This application claims the priority of Chinese patent application No. 201510082066.4, filed on Feb. 16, 2015, which is incorporated herewith by reference.

BACKGROUND OF THE INVENTION

1. Field of the Invention

The present invention belongs to the technical field of electric and electronic power conversion, in particular relates to an energy router for an energy internet.

2. The Prior Arts

From the 20th century, with the development of economy and society, energy is consumed increasingly, so people is forced by rapid increase in power demand to pay more attention to development of renewable energy. With the rapid increase in power load, the problem about stability and reliability of the traditional large-scale centralized power supply has occurred. Every country turns its attention on research on development of electric energy to use of clean renewable energy and distributed energy, and the distributed power generating system is developed rapidly. An energy router is the core power electronic equipment realizing information exchange and power sharing between the energy internet and the distribution grid. Reasonable design in the equipment can improve the performance of the distributed power generating device and the stability of the energy internet, and strengthen the support to the distribution grid.

The existing power conversion device with a solid state transformer as the core has small power capacity, single level of voltage it can supply, large limit on energy flow, single energy conversion form and low efficiency due to its backward topological structure. The traditional solid state transformer has single control mode; only from the perspective of controlling the grid-connected voltage, regarding the solid state transformer as the traditional transformer is a simple low-consumption substitute, which cannot realize the energy coordinated control policy based on the energy router.

SUMMARY OF THE INVENTION

Aiming at the defects of the prior art, the present invention provides an energy router for an energy internet.

The present invention has the following technical schemes.

An energy router for an energy internet comprises a three-phase three-level bi-directional rectifying unit, a six-phase interleaved DC/DC bi-directional conversion unit, a self-excitation soft start push-pull full-bridge DC/DC bi-directional conversion unit, a three-phase resonant soft switching bi-directional inversion unit, a single-phase full-bridge bi-directional inversion unit, a high-voltage DC bus and a low-voltage DC bus.

The input end of the three-phase three-level bi-directional rectifying unit is connected to a 10 KV distribution grid; the output end of the three-phase three-level bi-directional rectifying unit is connected with the high-voltage DC bus; the input ends of the self-excitation soft start push-pull full-bridge DC/DC bi-directional conversion unit and the six-phase interleaved DC/DC bi-directional conversion unit are respectively connected with the high-voltage DC bus; the output end of the self-excitation soft start push-pull full-bridge DC/DC bi-directional conversion unit is connected with a DC load, a distributed DC power generating device or a first energy storage device; the output end of the six-phase interleaved DC/DC bi-directional conversion unit is connected with the low-voltage DC bus; the input ends of the three-phase resonant soft switching bi-directional inversion unit and the single-phase full-bridge bi-directional inversion unit are connected with the low-voltage DC bus; the output end of the three-phase resonant soft switching bi-directional inversion unit is connected with a three-phase AC load, a distributed three-phase AC power generating device or a second energy storage device; the output end of the single-phase full-bridge bi-directional inversion unit is connected with a single-phase AC load, a distributed single-phase AC power generating device or a third energy storage device.

The three-phase three-level bi-directional rectifying unit is used for realizing power conversion between the 10 KV distribution grid and high-voltage direct current to operate in the rectification operating mode or inversion operating mode.

The six-phase interleaved DC/DC bi-directional conversion unit is used for realizing power conversion between high-voltage direct current and low-voltage direct current to operate in the voltage increasing operating mode or voltage dropping operating mode.

The self-excitation soft start push-pull full-bridge DC/DC bi-directional conversion unit is used for realizing conversion between high-voltage direct current and 240V direct current to operate in the voltage increasing operating mode or voltage dropping operating mode, and supplying appropriate direct current to the distributed DC power generating device, the DC load or the first energy storage device.

The three-phase resonant soft switching bi-directional inversion unit is used for realizing conversion between low-voltage direct current and 380V, 50 HZ alternating current to operate in the rectification operating mode or inversion operating mode.

The single-phase full-bridge bi-directional inversion unit is used for realizing conversion between low-voltage direct current and 220V, 50 HZ alternating current to operate in the rectification operating mode or inversion operating mode.

The high-voltage DC bus is used for stabilizing the output voltage of the three-phase three-level bi-directional rectifying unit, the input voltage of the six-phase interleaved DC/DC bi-directional conversion unit and the input voltage of the self-excitation soft start push-pull full-bridge DC/DC bi-directional conversion unit.

The low-voltage DC bus is used for stabilizing the output voltage of the six-phase interleaved DC/DC bi-directional conversion unit, the input voltage of the three-phase resonant soft switching bi-directional inversion unit and the input voltage of the single-phase full-bridge bi-directional inversion unit.

The three-phase three-level bi-directional rectifying unit, the six-phase interleaved DC/DC bi-directional conversion unit, the self-excitation soft start push-pull full-bridge DC/DC bi-directional conversion unit, the three-phase resonant soft switching bi-directional inversion unit and the single-phase full-bridge bi-directional inversion unit each have three energy flow operating modes: forward conduction, reverse conduction and non-conduction, wherein, energy flow from the input end to the output end is called forward conduction, energy flow from the output end to the input end is called reverse conduction, and no energy flow is called non-conduction. According to the energy flow operating mode of each unit, different operating modes of the energy router for the energy internet are formed.

The six-phase interleaved DC/DC bi-directional conversion unit comprises a high-frequency inversion module, a high-frequency transformer module and a rectification output module.

The input end of the high-frequency inversion module is connected with the high-voltage DC bus, and the output end of the high-frequency inversion module is connected with the input end of the high-frequency transformer module; the output end of the high-frequency transformer module is connected with the input end of the rectification output module; the output end of the rectification output module is connected with the low-voltage DC bus.

The high-frequency inversion module is used for realizing conversion between high-voltage direct current and high-voltage alternating current, and has two operating modes: inversion mode and rectification mode; when operating in the inversion mode, the high-frequency inversion module is used for inverting high-voltage direct current into high-voltage alternating current; and when operating in the rectification mode, the high-frequency inversion module 6 is used for rectifying high-voltage alternating current into high-voltage direct current.

The high-frequency transformer module is used for realizing conversion between high-voltage alternating current and low-voltage alternating current.

The rectification output module is used for realizing conversion between low-voltage alternating current and low-voltage direct current, and has two operating modes: inversion mode and rectification mode; when operating in the rectification mode, the rectification output module is used for rectifying low-voltage alternating current into low-voltage direct current; and when operating in the inversion mode, the rectification output module 8 is used for inverting low-voltage direct current into low-voltage alternating current.

The control circuit of the six-phase interleaved DC/DC bi-directional conversion unit comprises a DSP, a drive circuit, a power supply circuit and a sampling circuit.

The input end of the sampling circuit is respectively connected with the high-voltage DC bus and the low-voltage DC bus; the output end of the sampling circuit is connected with the input end of the DSP; the output end of the DSP is connected with the input end of the drive circuit; the output end of the drive circuit is respectively connected with the high-frequency inversion module and the rectification output module of the six-phase interleaved DC/DC bi-directional conversion unit; the power supply circuit is respectively connected to the DSP, the drive circuit and the sampling circuit.

The DSP is used for generating PWM signals driving the insulated gate bipolar transistor of the six-phase interleaved DC/DC bi-directional conversion unit.

The drive circuit is used for amplifying PWM signals which are generated by the DSP to drive the insulated gate bipolar transistor of the six-phase interleaved DC/DC bi-directional conversion unit to control on-off of insulated gate bipolar transistors of the high-frequency inversion module and the rectification output module.

The power supply circuit is used for supplying electric energy to the DSP, the sampling circuit and the drive circuit.

The sampling circuit is used for collecting voltage signals and current signals of the high-voltage DC bus and voltage signals and current signals of the low-voltage DC bus and transmitting these signals to the DSP.

The control method of the six-phase interleaved DC/DC bi-directional conversion unit comprises the following steps:

Step 1: Initializing the six-phase interleaved DC/DC bi-directional conversion unit and precharging the high-voltage DC bus equivalent capacitor and the low-voltage DC bus equivalent capacitor.

Step 2: The sampling circuit collecting voltage signals of the high-voltage DC bus and voltage signals of the low-voltage DC bus and transmitting the voltage signals to the DSP.

Step 3: The DSP calculating active power and reactive power that flow through the high-voltage DC bus and the low-voltage DC bus in real time; judging the energy flow direction of the six-phase interleaved DC/DC bi-directional conversion unit; outputting a PWM signal to the drive circuit; if energy flows from the input end to the output end of the six-phase interleaved DC/DC bi-directional conversion unit, the six-phase interleaved DC/DC bi-directional conversion unit operating in a voltage dropping operating mode and executing Step 4; if the energy flows from the output end to the input end of the six-phase interleaved DC/DC bi-directional conversion unit, the six-phase interleaved DC/DC bi-directional conversion unit operating in a voltage increasing operating mode and executing Step 5; if no energy flows through the six-phase interleaved DC/DC bi-directional conversion unit, the six-phase interleaved DC/DC bi-directional conversion unit being in a stop mode.

Step 4: The six-phase interleaved DC/DC bi-directional conversion unit operating in the voltage dropping operating mode; the high-frequency inversion module of the six-phase interleaved DC/DC bi-directional conversion unit operating by different operating modes; the rectification output module being in a natural rectification state.

Step 5: The six-phase interleaved DC/DC bi-directional conversion unit operating in the voltage increasing operating mode; the rectification output module of the six-phase interleaved DC/DC bi-directional conversion unit operating by different operating modes; the high-frequency inversion module being in a natural rectification state.

The present invention has the following beneficial effects.

The energy router for the energy internet provided by the present invention can supply plug and play electric energy, and realize voltage conversion and energy transfer in the power system through power electronic conversion technology; compared with the traditional transformer, the energy router for the energy internet has the advantages of small volume, light weight, small no-load loss, no use of insulating oil, etc., and has the functions of converting voltage, transferring energy, limiting fault current, compensating reactive power, improving quality of electric energy, and providing standardized interfaces for various devices. Compared with the traditional single-phase rectification solid state transformer, the energy router provided by the present invention has larger capacity and outputs less electric energy harmonic due to the three-phase three-level bi-directional rectifying unit installed on its front end; different from the traditional transformer, the six-phase interleaved DC/DC conversion unit provided by the present invention operates at high frequency above 10 KHZ to reduce the volume and weight of the transformer in the circuit. a six-phase interleaved inverter circuit having 12 operating modes within each period is adopted on the primary side of the high-frequency transformer, and has less switching action than the traditional three-phase inversion unit, so the harmonic content of output electric energy is small, the efficiency of electric energy conversion is high, and the switching loss and voltage and current stresses are small. The traditional solid state transformer has single control mode; only from the perspective of controlling the grid-connected voltage, regarding the solid state transformer as the traditional transformer is simple low-consumption substitute, which cannot realize the energy coordinated control policy based on the solid state transformer. Different from the fact that the distributed energy is connected into the distributed grid by electric energy only from the low-voltage DC bus when the traditional solid state transformer is connected; the present invention proposes that the distributed energy is connected into the distributed grid from each energy end, so the energy conversion form is more diverse, and bi-directional flow of energy is fundamentally realized. With the multi-unit topological structure, the energy router can provide electric energy with multiple voltage levels to meet the demands of various loads and energy storage devices.

DETAILED DESCRIPTION OF THE PREFERRED EMBODIMENT

One embodiment of the present invention is detailed in combination with the figures.

Figure 1:
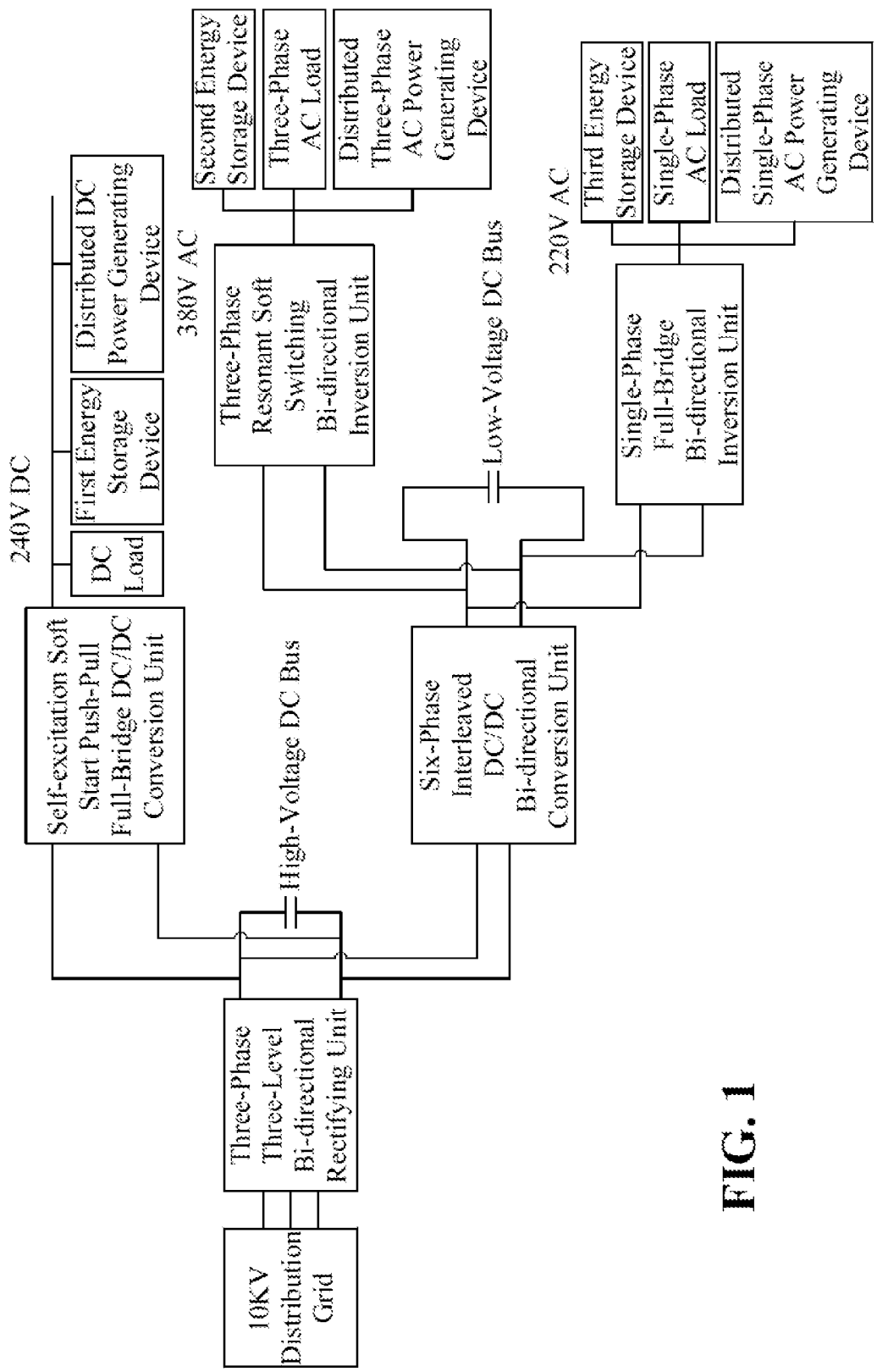
FIG. 1 is a structure diagram of the energy router for the energy internet for one embodiment of the present invention.

An energy router for an energy internet, as shown in FIG. 1, comprises a three-phase three-level bi-directional rectifying unit, a six-phase interleaved DC/DC bi-directional conversion unit, a self-excitation soft start push-pull full-bridge DC/DC bi-directional conversion unit, a three-phase resonant soft switching bi-directional inversion unit, a single-phase full-bridge bi-directional inversion unit, a high-voltage DC bus and a low-voltage DC bus.

The high-voltage DC bus has adjustable high-voltage direct current, and the voltage of the high-voltage DC bus in the embodiment is about 18 KV.

The low-voltage DC bus has adjustable low-voltage direct current with the voltage of 600V to 800V, and the voltage of the low-voltage DC bus in the embodiment is 600V.

Figure 2:
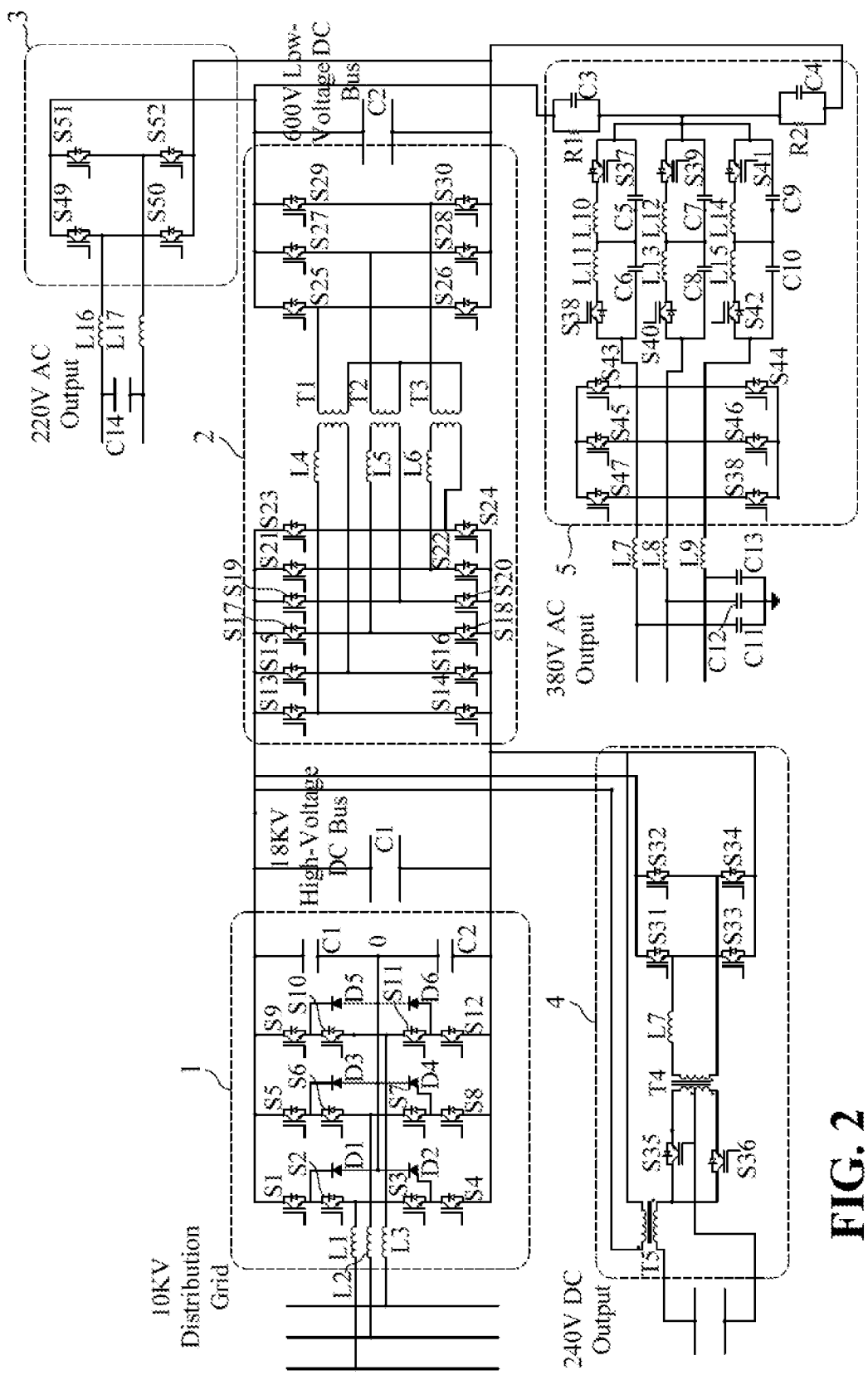
FIG. 2 is a schematic circuit diagram of the energy router for the energy internet for one embodiment of the present invention, wherein this figure shows a three-phase three-level bi-directional rectifying unit 1, a six-phase interleaved DC/DC bi-directional conversion unit 2, a single-phase full-bridge bi-directional inversion unit 3, a self-excitation soft start push-pull full-bridge DC/DC bi-directional conversion unit 4 and a three-phase resonant soft switching bi-directional inversion unit 5.

The schematic circuit diagram of the energy router for the energy internet is shown in FIG. 2. The input end of the three-phase three-level bi-directional rectifying unit 1 is connected with the 10 KV distribution grid; the output end of the three-phase three-level bi-directional rectifying unit 1 is connected with the 18 KV high-voltage DC bus; the input end of the self-excitation soft start push-pull full-bridge DC/DC bi-directional conversion unit 4 and the input end of the six-phase interleaved DC/DC bi-directional conversion unit 2 are respectively connected with the 18 KV high-voltage DC bus; the output end of the self-excitation soft start push-pull full-bridge DC/DC bi-directional conversion unit 4 is connected with a DC load, a distributed DC power generating device or a first energy storage device; the output end of the six-phase interleaved DC/DC bi-directional conversion unit 2 is respectively connected with the 600V low-voltage DC bus; the input end of the three-phase resonant soft switching bi-directional inversion unit 5 and the input end of the single-phase full-bridge bi-directional inversion unit 3 are connected with the 600V low-voltage DC bus; the output end of the three-phase resonant soft switching bi-directional inversion unit 5 is connected with a three-phase AC load, a distributed three-phase AC power generating device or a second energy storage device; the output end of the single-phase full-bridge bi-directional inversion unit 3 is connected with a single-phase AC load, a distributed single-phase AC power generating device or a third energy storage device.

The three-phase three-level bi-directional rectifying unit 1 is used for realizing power conversion between the 10 KV distribution grid and high-voltage direct current to operate in the rectification operating mode or inversion operating mode according to different control methods, and making electric energy flow bi-directionally between the 10 KV distribution grid and the 18 KV high-voltage DC bus.

For example, when operating in rectification operating mode, the three-phase three-level bi-directional rectifying unit 1 will convert the 10 KV, 50 HZ alternating current inputted by the distribution grid into high-voltage direct current, maintain the sinusoidal waveform of the input current of the distribution grid, and keep pace with the input voltage of the distribution grid in order to obtain a unit input power factor, realize reactive power compensation, and maintain a constant voltage of the DC side high-voltage DC bus connected with the three-phase three-level bi-directional rectifying unit 1 at the same time.

The six-phase interleaved DC/DC bi-directional conversion unit 2 is used for realizing power conversion between high-voltage direct current and low-voltage direct current to operate in the voltage increasing operating mode or voltage dropping operating mode according to different control methods, and making electric energy flow bi-directionally between the 18 KV high-voltage DC bus and the 600V low-voltage DC bus. The six-phase interleaved DC/DC bi-directional conversion unit 2, as a key link in the device of the present invention, serves as a bridge for conversion between grid electric energy and distributed grid-connected energy. As the six-phase interleaved DC/DC bi-directional conversion unit 2 operates in high-frequency mode, the energy conversion efficiency is increased to some extent, and the volume of hardware circuit is greatly reduced.

The single-phase full-bridge bi-directional inversion unit 3 is used for realizing conversion between the low-voltage direct current and 220V, 50 HZ alternating current to operate in the rectification operating mode or inversion operating mode according to different control methods, and making energy flow among the distributed single-phase AC power generating device, the single-phase AC load, the third energy storage device and the 600V low-voltage DC bus.

The self-excitation soft start push-pull full-bridge DC/DC bi-directional conversion unit 4 is used for realizing conversion between high-voltage direct current and 240V direct current to operate in the voltage increasing operating mode or voltage dropping operating mode; supplying appropriate DC voltage to the distributed DC power generating device, the DC load or the first energy storage device; making energy flow among the distributed DC power generating device, the DC load, the first energy storage device and the 18 KV high-voltage DC bus; and increasing the power supplying reliability of the system at the same time. As this unit has the characteristics of soft start, the power loss of the unit is reduced.

The three-phase resonant soft switching bi-directional inversion unit 5 is used for realizing conversion between the low-voltage direct current and 380V, 50 HZ alternating current to operate in the rectification operating mode or inversion operating mode according to different control methods, and making energy flow among the distributed three-phase AC power generating device, the three-phase AC load, the second energy storage device and the 600V low-voltage DC bus.

The high-voltage DC bus is used for stabilizing the output voltage of the three-phase three-level bi-directional rectifying unit 1, the input voltage of the six-phase DC/DC bi-directional conversion unit 2 and the input voltage of the self-excitation soft start push-pull full-bridge DC/DC bi-directional conversion unit 4; connecting the three-phase three-level bi-directional rectifying unit 1, the six-phase DC/DC bi-directional conversion unit 2 and the self-excitation soft start push-pull full-bridge DC/DC bi-directional conversion unit 4; and making energy flow among the three-phase three-level bi-directional rectifying unit 1, the six-phase DC/DC bi-directional conversion unit 2 and the self-excitation soft start push-pull full-bridge DC/DC bi-directional conversion unit 4.

The low-voltage DC bus is used for stabilizing the output voltage of the six-phase interleaved DC/DC bi-directional conversion unit 2, the input voltage of the three-phase resonant soft switching bi-directional inversion unit 5 and the input voltage of the single-phase full-bridge bi-directional inversion unit 3; and making energy flow among the six-phase interleaved DC/DC bi-directional conversion unit 2, the three-phase resonant soft switching bi-directional inversion unit 5 and the single-phase full-bridge bi-directional inversion unit 3.

Figure 3:
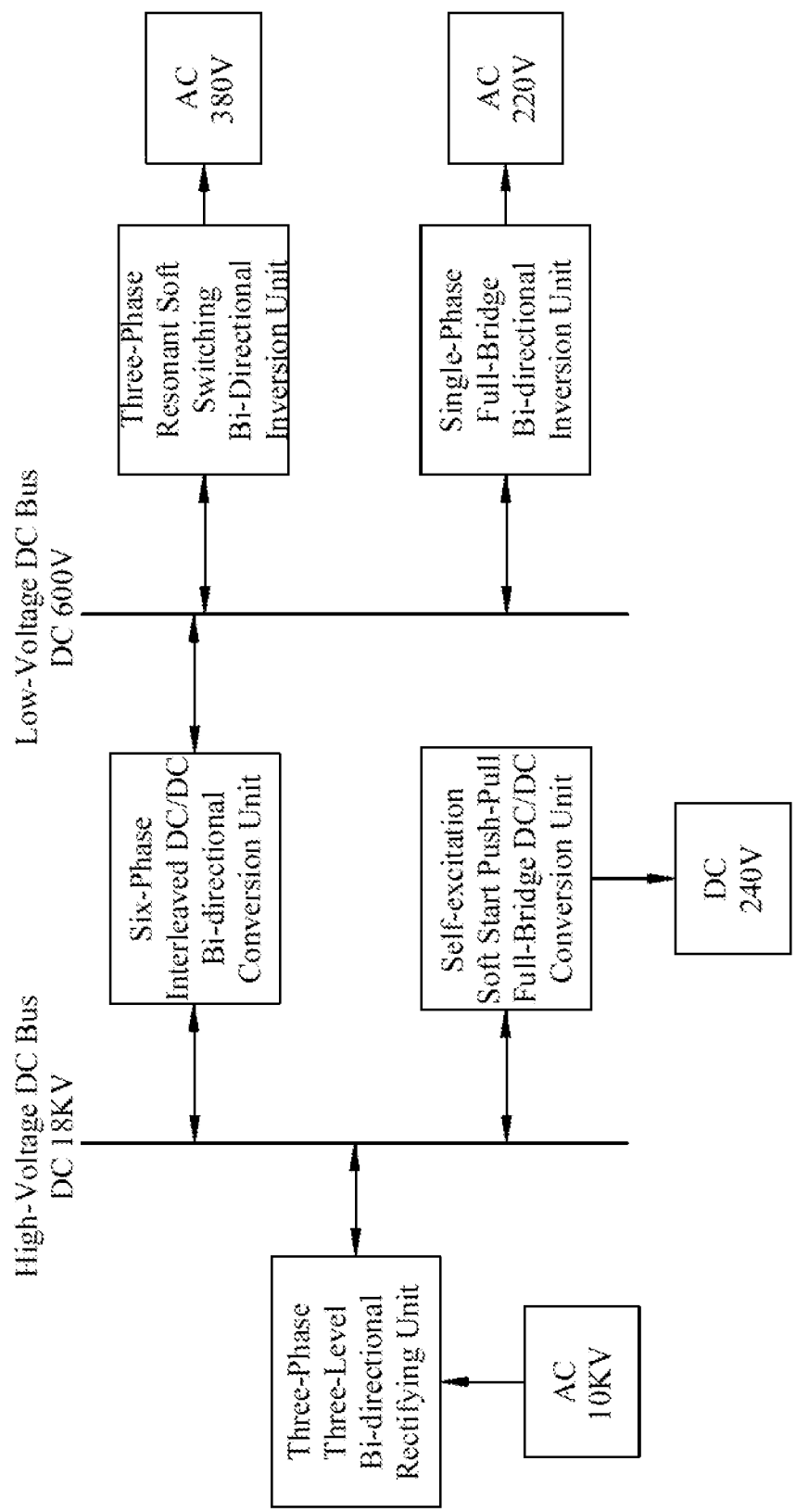
FIG. 3 is a schematic diagram of energy flow modes of five units in the energy router for the energy internet for one embodiment of the present invention.

The energy flowing mode of the five units in the energy router for the energy internet is shown in FIG. 3. The three-phase three-level bi-directional rectifying unit, the six-phase interleaved DC/DC bi-directional conversion unit, the self-excitation soft start push-pull full-bridge DC/DC bi-directional conversion unit, the three-phase resonant soft switching bi-directional inversion unit and the single-phase full-bridge bi-directional inversion unit each have three energy flow operating modes: forward conduction, reverse conduction and non-conduction, wherein, energy flow from the input end to the output end is called forward conduction, energy flow from the output end to the input end is called reverse conduction, and no energy flow is called non-conduction. According to the energy flow operating mode of each unit, different operating modes for the energy router for the energy internet are formed as follows:

Mode a: When the six-phase interleaved DC/DC bi-directional conversion unit is in non-conduction mode, the three-phase three-level bi-directional rectifying unit, the self-excitation soft start push-pull full-bridge DC/DC bi-directional conversion unit, the three-phase resonant soft switching bi-directional inversion unit and the single-phase full-bridge bi-directional inversion unit are in the following operating modes:

Mode a1: The three-phase three-level bi-directional rectifying unit, the three-phase resonant soft switching bi-directional inversion unit and the self-excitation soft start push-pull full-bridge DC/DC bi-directional conversion unit are in forward conduction mode, and the single-phase full-bridge bi-directional inversion unit is in reverse conduction mode.

Mode a2: The three-phase three-level bi-directional rectifying unit, the self-excitation soft start push-pull full-bridge DC/DC bi-directional conversion unit and the single-phase full-bridge bi-directional inversion unit are in forward conduction mode, and the three-phase resonant soft switching bi-directional inversion unit is in reverse conduction mode.

Mode a3: The three-phase three-level bi-directional rectifying unit and self-excitation soft start push-pull full-bridge DC/DC bi-directional conversion unit are in forward conduction mode; the three-phase resonant soft switching bi-directional inversion unit and the single-phase full-bridge bi-directional inversion unit are in non-conduction mode.

Mode a4: The three-phase three-level bi-directional rectifying unit, the self-excitation soft start push-pull full-bridge DC/DC bi-directional conversion unit and the single-phase full-bridge bi-directional inversion unit are in reverse conduction mode, and the three-phase resonant soft switching bi-directional inversion unit is in forward conduction mode.

Mode a5: The three-phase three-level bi-directional rectifying unit, the three-phase resonant soft switching bi-directional inversion unit and the self-excitation soft start push-pull full-bridge DC/DC bi-directional conversion unit are in reverse conduction mode, and the single-phase full-bridge bi-directional inversion unit is in forward conduction mode.

Mode a6: The three-phase three-level bi-directional rectifying unit and self-excitation soft start push-pull full-bridge DC/DC bi-directional conversion unit are in reverse conduction mode; the three-phase resonant soft switching bi-directional inversion unit and the single-phase full-bridge bi-directional inversion unit are in non-conduction mode.

Mode a7: The three-phase three-level bi-directional rectifying unit and the three-phase resonant soft switching bi-directional inversion unit are in non-conduction mode; the self-excitation soft start push-pull full-bridge DC/DC bi-directional conversion unit is in forward conduction mode, and the single-phase full-bridge bi-directional inversion unit is in reverse conduction mode.

Mode a8: The three-phase three-level bi-directional rectifying unit and the three-phase resonant soft switching bi-directional inversion unit are in non-conduction mode; the self-excitation soft start push-pull full-bridge DC/DC bi-directional conversion unit is in reverse conduction mode, and the single-phase full-bridge bi-directional inversion unit is in forward conduction mode.

Mode a9: The three-phase three-level bi-directional rectifying unit, the three-phase resonant soft switching bi-directional inversion unit, the self-excitation soft start push-pull full-bridge DC/DC bi-directional conversion unit and the single-phase full-bridge bi-directional inversion unit are in non-conduction mode; i.e. the present invention is shut down, and the units have no energy flow.

Mode b: When the six-phase interleaved DC/DC bi-directional conversion unit is in forward conduction mode, the three-phase three-level bi-directional rectifying unit, the self-excitation soft start push-pull full-bridge DC/DC bi-directional conversion unit, the three-phase resonant soft switching bi-directional inversion unit and the single-phase full-bridge bi-directional inversion unit are in the following operating modes:

Mode b1: The three-phase three-level bi-directional rectifying unit, the self-excitation soft start push-pull full-bridge DC/DC bi-directional conversion unit and the single-phase full-bridge bi-directional inversion unit are in forward conduction mode, and the three-phase resonant soft switching bi-directional inversion unit is in non-conduction mode.

Mode b2: The three-phase three-level bi-directional rectifying unit, the self-excitation soft start push-pull full-bridge DC/DC bi-directional conversion unit, the three-phase resonant soft switching bi-directional inversion unit and the three-phase resonant soft switching bi-directional inversion unit are in forward conduction mode.

Mode b3: The three-phase three-level bi-directional rectifying unit, the self-excitation soft start push-pull full-bridge DC/DC bi-directional conversion unit and the three-phase resonant soft switching bi-directional inversion unit are in forward conduction mode, and the single-phase full-bridge bi-directional inversion unit is in non-conduction mode.

Mode b4: The three-phase three-level bi-directional rectifying unit, the self-excitation soft start push-pull full-bridge DC/DC bi-directional conversion unit and the three-phase resonant soft switching bi-directional inversion unit are in forward conduction mode, and the single-phase full-bridge bi-directional inversion unit is in reverse conduction mode.

Mode b5: The three-phase three-level bi-directional rectifying unit, the self-excitation soft start push-pull full-bridge DC/DC bi-directional conversion unit and the single-phase full-bridge bi-directional inversion unit are in forward conduction mode, and the three-phase resonant soft switching bi-directional inversion unit is in reverse conduction mode.

Mode b6: The three-phase three-level bi-directional rectifying unit and the single-phase full-bridge bi-directional inversion unit are in forward conduction mode, the self-excitation soft start push-pull full-bridge DC/DC bi-directional conversion unit is in reverse conduction mode, and the three-phase resonant soft switching bi-directional inversion unit is in non-conduction mode.

Mode b7: The three-phase three-level bi-directional rectifying unit, the three-phase resonant soft switching bi-directional inversion unit and the single-phase full-bridge bi-directional inversion unit are in forward conduction mode, and the self-excitation soft start push-pull full-bridge DC/DC bi-directional conversion unit is in reverse conduction mode.

Mode b8: The three-phase three-level bi-directional rectifying unit and the three-phase resonant soft switching bi-directional inversion unit are in forward conduction mode, the self-excitation soft start push-pull full-bridge DC/DC bi-directional conversion unit is in reverse conduction mode, and the single-phase full-bridge bi-directional inversion unit is in non-conduction mode.

Mode b9: The three-phase three-level bi-directional rectifying unit and the three-phase resonant soft switching bi-directional inversion unit are in forward conduction mode; the self-excitation soft start push-pull full-bridge DC/DC bi-directional conversion unit and the single-phase full-bridge bi-directional inversion unit are in reverse conduction mode.

Mode b10: The three-phase three-level bi-directional rectifying unit and the single-phase full-bridge bi-directional inversion unit are in forward conduction mode; the self-excitation soft start push-pull full-bridge DC/DC bi-directional conversion unit and the three-phase resonant soft switching bi-directional inversion unit are in reverse conduction mode.

Mode b11: The three-phase three-level bi-directional rectifying unit is in reverse conduction mode, the self-excitation soft start push-pull full-bridge DC/DC bi-directional conversion unit and the three-phase resonant soft switching bi-directional inversion unit are in non-conduction mode, and the single-phase full-bridge bi-directional inversion unit is in forward conduction mode.

Mode b12: The three-phase three-level bi-directional rectifying unit is in reverse conduction mode, the self-excitation soft start push-pull full-bridge DC/DC bi-directional conversion unit is in non-conduction mode, and the three-phase resonant soft switching bi-directional inversion unit and the single-phase full-bridge bi-directional inversion unit are in forward conduction mode.

Mode b13: The three-phase three-level bi-directional rectifying unit is in reverse conduction mode, the self-excitation soft start push-pull full-bridge DC/DC bi-directional conversion unit and the single-phase full-bridge bi-directional inversion unit are in non-conduction mode, and the three-phase resonant soft switching bi-directional inversion unit is in forward conduction mode.

Mode b14: The three-phase three-level bi-directional rectifying unit and the single-phase full-bridge bi-directional inversion unit are in reverse conduction mode, the self-excitation soft start push-pull full-bridge DC/DC bi-directional conversion unit is in non-conduction mode, and the three-phase resonant soft switching bi-directional inversion unit is in forward conduction mode.

Mode b15: The three-phase three-level bi-directional rectifying unit and the three-phase resonant soft switching bi-directional inversion unit are in reverse conduction mode, the self-excitation soft start push-pull full-bridge DC/DC bi-directional conversion unit is in non-conduction mode, and the single-phase full-bridge bi-directional inversion unit is in forward conduction mode.

Mode b16: The three-phase three-level bi-directional rectifying unit and the single-phase full-bridge bi-directional inversion unit are in forward conduction; the three-phase resonant soft switching bi-directional inversion unit and the self-excitation soft start push-pull full-bridge DC/DC bi-directional conversion unit are in non-conduction mode.

Mode b17: The three-phase three-level bi-directional rectifying unit, the three-phase resonant soft switching bi-directional inversion unit and the single-phase full-bridge bi-directional inversion unit are in forward conduction mode, and the self-excitation soft start push-pull full-bridge DC/DC bi-directional conversion unit is in non-conduction mode.

Mode b18: The three-phase three-level bi-directional rectifying unit and the three-phase resonant soft switching bi-directional inversion unit are in forward conduction mode; the self-excitation soft start push-pull full-bridge DC/DC bi-directional conversion unit and the single-phase full-bridge bi-directional inversion unit are in non-conduction mode.

Mode b19: The three-phase three-level bi-directional rectifying unit and the three-phase resonant soft switching bi-directional inversion unit are in reverse conduction mode, the self-excitation soft start push-pull full-bridge DC/DC bi-directional conversion unit is in non-conduction mode, and the single-phase full-bridge bi-directional inversion unit is in reverse conduction mode.

Mode b20: The three-phase three-level bi-directional rectifying unit and the single-phase full-bridge bi-directional inversion unit are in forward conduction mode, the self-excitation soft start push-pull full-bridge DC/DC bi-directional conversion unit is in non-conduction mode, and the three-phase resonant soft switching bi-directional inversion unit is in reverse conduction mode.

Mode b21: The three-phase three-level bi-directional rectifying unit and the self-excitation soft start push-pull full-bridge DC/DC bi-directional conversion unit are in reverse conduction mode, the three-phase resonant soft switching bi-directional inversion unit is in non-conduction mode, and the single-phase full-bridge bi-directional inversion unit is in forward conduction mode.

Mode b22: The three-phase three-level bi-directional rectifying unit and the self-excitation soft start push-pull full-bridge DC/DC bi-directional conversion unit are in reverse conduction mode; the three-phase resonant soft switching bi-directional inversion unit and the single-phase full-bridge bi-directional inversion unit are in non-conduction mode.

Mode b23: The three-phase three-level bi-directional rectifying unit and the self-excitation soft start push-pull full-bridge DC/DC bi-directional conversion unit are in reverse conduction mode, the three-phase resonant soft switching bi-directional inversion unit is in forward conduction mode, and the single-phase full-bridge bi-directional inversion unit is in non-conduction mode.

Mode b24: The three-phase three-level bi-directional rectifying unit, the self-excitation soft start push-pull full-bridge DC/DC bi-directional conversion unit and the single-phase full-bridge bi-directional inversion unit are in reverse conduction mode, and the three-phase resonant soft switching bi-directional inversion unit is in forward conduction mode.

Mode b25: The three-phase three-level bi-directional rectifying unit, the self-excitation soft start push-pull full-bridge DC/DC bi-directional conversion unit and the three-phase resonant soft switching bi-directional inversion unit are in reverse conduction mode, and the single-phase full-bridge bi-directional inversion unit is in forward conduction mode.

Mode c: When the six-phase interleaved DC/DC bi-directional conversion unit is in reverse conduction mode, the three-phase three-level bi-directional rectifying unit, the self-excitation soft start push-pull full-bridge DC/DC bi-directional conversion unit, the three-phase resonant soft switching bi-directional inversion unit and the single-phase full-bridge bi-directional inversion unit are in the following operating modes:

Mode c1: The three-phase three-level bi-directional rectifying unit, the self-excitation soft start push-pull full-bridge DC/DC bi-directional conversion unit and the three-phase resonant soft switching bi-directional inversion unit are in reverse conduction mode, and the single-phase full-bridge bi-directional inversion unit is in non-conduction mode.

Mode c2: The three-phase three-level bi-directional rectifying unit, the self-excitation soft start push-pull full-bridge DC/DC bi-directional conversion unit and the single-phase full-bridge bi-directional inversion unit are in reverse conduction mode, and the three-phase resonant soft switching bi-directional inversion unit is in non-conduction mode.

Mode c3: The three-phase three-level bi-directional rectifying unit, the self-excitation soft start push-pull full-bridge DC/DC bi-directional conversion unit and the three-phase resonant soft switching bi-directional inversion unit are in reverse conduction mode, and the single-phase full-bridge bi-directional inversion unit is in forward conduction mode.

Mode c4: The three-phase three-level bi-directional rectifying unit, the self-excitation soft start push-pull full-bridge DC/DC bi-directional conversion unit and the single-phase full-bridge bi-directional inversion unit are in reverse conduction mode, and the three-phase resonant soft switching bi-directional inversion unit is in forward conduction mode.

Mode c5: The three-phase three-level bi-directional rectifying unit, the self-excitation soft start push-pull full-bridge DC/DC bi-directional conversion unit, the three-phase resonant soft switching bi-directional inversion unit and the three-phase resonant soft switching bi-directional inversion unit are in reverse conduction mode.

Mode c6: The three-phase three-level bi-directional rectifying unit and the self-excitation soft start push-pull full-bridge DC/DC bi-directional conversion unit are in forward conduction mode, the three-phase resonant soft switching bi-directional inversion unit is in reverse conduction mode, and the single-phase full-bridge bi-directional inversion unit is in non-conduction mode.

Mode c7: The three-phase three-level bi-directional rectifying unit and the self-excitation soft start push-pull full-bridge DC/DC bi-directional conversion unit are in forward conduction mode, the three-phase resonant soft switching bi-directional inversion unit is in non-conduction mode, and the single-phase full-bridge bi-directional inversion unit is in reverse conduction mode.

Mode c8: The three-phase three-level bi-directional rectifying unit, the self-excitation soft start push-pull full-bridge DC/DC bi-directional conversion unit and the single-phase full-bridge bi-directional inversion unit are in forward conduction mode, and the three-phase resonant soft switching bi-directional inversion unit is in reverse conduction mode.

Mode c9: The three-phase three-level bi-directional rectifying unit, the self-excitation soft start push-pull full-bridge DC/DC bi-directional conversion unit and the three-phase resonant soft switching bi-directional inversion unit are in forward conduction mode, and the single-phase full-bridge bi-directional inversion unit is in reverse conduction mode.

Mode c10: The three-phase three-level bi-directional rectifying unit and the self-excitation soft start push-pull full-bridge DC/DC bi-directional conversion unit are in forward conduction mode; the three-phase resonant soft switching bi-directional inversion unit and the single-phase full-bridge bi-directional inversion unit are in reverse conduction mode.

Mode c11: The three-phase three-level bi-directional rectifying unit and the three-phase resonant soft switching bi-directional inversion unit are in reverse conduction mode, the self-excitation soft start push-pull full-bridge DC/DC bi-directional conversion unit is in forward conduction mode, and the single-phase full-bridge bi-directional inversion unit is in non-conduction mode.

Mode c12: The three-phase three-level bi-directional rectifying unit and the single-phase full-bridge bi-directional inversion unit are in reverse conduction mode, the self-excitation soft start push-pull full-bridge DC/DC bi-directional conversion unit is in forward conduction mode, and the three-phase resonant soft switching bi-directional inversion unit is in non-conduction mode.

Mode c13: The three-phase three-level bi-directional rectifying unit and the three-phase resonant soft switching bi-directional inversion unit are in reverse conduction mode; the self-excitation soft start push-pull full-bridge DC/DC bi-directional conversion unit and the single-phase full-bridge bi-directional inversion unit are in forward conduction mode.

Mode c14: The three-phase three-level bi-directional rectifying unit and the single-phase full-bridge bi-directional inversion unit are in reverse conduction mode; the self-excitation soft start push-pull full-bridge DC/DC bi-directional conversion unit and the three-phase resonant soft switching bi-directional inversion unit are in forward conduction mode.

Mode c15: The three-phase three-level bi-directional rectifying unit, the three-phase resonant soft switching bi-directional inversion unit and the single-phase full-bridge bi-directional inversion unit are in reverse conduction mode, and the self-excitation soft start push-pull full-bridge DC/DC bi-directional conversion unit is in forward conduction mode.

Mode c16: The three-phase three-level bi-directional rectifying unit and the single-phase full-bridge bi-directional inversion unit are in non-conduction mode, the self-excitation soft start push-pull full-bridge DC/DC bi-directional conversion unit is in forward conduction mode, and the three-phase resonant soft switching bi-directional inversion unit is in reverse conduction mode.

Mode c17: The three-phase three-level bi-directional rectifying unit and the three-phase resonant soft switching bi-directional inversion unit are in non-conduction mode, the self-excitation soft start push-pull full-bridge DC/DC bi-directional conversion unit is in forward conduction mode, and the single-phase full-bridge bi-directional inversion unit is in reverse conduction mode.

Mode c18: The three-phase three-level bi-directional rectifying unit is in non-conduction mode, the self-excitation soft start push-pull full-bridge DC/DC bi-directional conversion unit and the single-phase full-bridge bi-directional inversion unit are in forward conduction mode, and the three-phase resonant soft switching bi-directional inversion unit is in reverse conduction mode.

Mode c19: The three-phase three-level bi-directional rectifying unit is in non-conduction mode, the self-excitation soft start push-pull full-bridge DC/DC bi-directional conversion unit and the three-phase resonant soft switching bi-directional inversion unit are in forward conduction mode, and the single-phase full-bridge bi-directional inversion unit is in reverse conduction mode.

Mode c20: The three-phase three-level bi-directional rectifying unit is in non-conduction mode, the self-excitation soft start push-pull full-bridge DC/DC bi-directional conversion unit is in forward conduction mode, and the three-phase resonant soft switching bi-directional inversion unit and the single-phase full-bridge bi-directional inversion unit are in reverse conduction mode.

Mode c21: The three-phase three-level bi-directional rectifying unit and the three-phase resonant soft switching bi-directional inversion unit are in reverse conduction mode; the self-excitation soft start push-pull full-bridge DC/DC bi-directional conversion unit and the single-phase full-bridge bi-directional inversion unit are in non-conduction mode.

Mode c22: The three-phase three-level bi-directional rectifying unit and the single-phase full-bridge bi-directional inversion unit are in reverse conduction mode; the self-excitation soft start push-pull full-bridge DC/DC bi-directional conversion unit and the three-phase resonant soft switching bi-directional inversion unit are in non-conduction mode.

Mode c23: The three-phase three-level bi-directional rectifying unit and the three-phase resonant soft switching bi-directional inversion unit are in reverse conduction mode, the self-excitation soft start push-pull full-bridge DC/DC bi-directional conversion unit is in non-conduction mode, and the single-phase full-bridge bi-directional inversion unit is in forward conduction mode.

Mode c24: The three-phase three-level bi-directional rectifying unit and the single-phase full-bridge bi-directional inversion unit are in reverse conduction mode, the self-excitation soft start push-pull full-bridge DC/DC bi-directional conversion unit is in non-conduction mode, and the three-phase resonant soft switching bi-directional inversion unit is in forward conduction mode.

Mode c25: The three-phase three-level bi-directional rectifying unit, the single-phase full-bridge bi-directional inversion unit and the three-phase resonant soft switching bi-directional inversion unit are in reverse conduction, and the self-excitation soft start push-pull full-bridge DC/DC bi-directional conversion unit is in non-conduction mode.

Energy flow from the input end to the output end is called forward conduction and is denoted by "1"; energy flow from the output end to the input end is called reverse conduction and is denoted by "−1"; no energy flow is called non-conduction and is denoted by "0"; then the operating modes of the energy router for the energy internet is shown as Table 1:

TABLE 1

Operating Modes of an Energy Router for an Energy Internet

| Operating Mode | Three-Phase Three-Level Bi-directional Rectifying Unit | Self-excitation Soft Start Push-Pull Full-Bridge DC/DC Bi-directional Conversion Unit | Six-Phase Interleaved DC/DC Bi-directional Conversion Unit | Three-Phase Resonant Soft Switching Bi-directional Inversion Unit | Single-Phase Full-Bridge Bi-directional Inversion Unit |
|---|---|---|---|---|---|
| Mode a1 | 1 | 1 | 0 | 1 | −1 |
| Mode a2 | 1 | 1 | 0 | −1 | 1 |
| Mode a3 | 1 | 1 | 0 | 0 | 0 |
| Mode a4 | −1 | −1 | 0 | 1 | −1 |
| Mode a5 | −1 | −1 | 0 | −1 | 1 |
| Mode a6 | −1 | −1 | 0 | 0 | 0 |
| Mode a7 | 0 | 0 | 0 | 1 | −1 |
| Mode a8 | 0 | 0 | 0 | −1 | 1 |
| Mode a9 | 0 | 0 | 0 | 0 | 0 |
| Mode b1 | 1 | 1 | 1 | 0 | 1 |
| Mode b2 | 1 | 1 | 1 | 1 | 1 |
| Mode b3 | 1 | 1 | 1 | 1 | 0 |
| Mode b4 | 1 | 1 | 1 | 1 | −1 |
| Mode b5 | 1 | 1 | 1 | −1 | 1 |
| Mode b6 | 1 | −1 | 1 | 0 | 1 |
| Mode b7 | 1 | −1 | 1 | 1 | 1 |
| Mode b8 | 1 | −1 | 1 | 1 | 0 |
| Mode b9 | 1 | −1 | 1 | 1 | −1 |
| Mode b10 | 1 | −1 | 1 | −1 | 1 |
| Mode b11 | 0 | −1 | 1 | 0 | 1 |
| Mode b12 | 0 | −1 | 1 | 1 | 1 |
| Mode b13 | 0 | −1 | 1 | 1 | 0 |
| Mode b14 | 0 | −1 | 1 | 1 | −1 |
| Mode b15 | 0 | −1 | 1 | −1 | 1 |
| Mode b16 | 1 | 0 | 1 | 0 | 1 |
| Mode b17 | 1 | 0 | 1 | 1 | 1 |
| Mode b18 | 1 | 0 | 1 | 1 | 0 |
| Mode b19 | 1 | 0 | 1 | 1 | −1 |
| Mode b20 | 1 | 0 | 1 | −1 | 1 |
| Mode b21 | −1 | −1 | 1 | 0 | 1 |
| Mode b22 | −1 | −1 | 1 | 1 | 1 |
| Mode b23 | −1 | −1 | 1 | 1 | 0 |
| Mode b24 | −1 | −1 | 1 | 1 | −1 |
| Mode b25 | −1 | −1 | 1 | −1 | 1 |
| Mode c1 | −1 | −1 | −1 | −1 | 0 |
| Mode c2 | −1 | −1 | −1 | 0 | −1 |
| Mode c3 | −1 | −1 | −1 | −1 | 1 |
| Mode c4 | −1 | −1 | −1 | 1 | −1 |
| Mode c5 | −1 | −1 | −1 | −1 | −1 |
| Mode c6 | 1 | 1 | −1 | −1 | 0 |
| Mode c7 | 1 | 1 | −1 | 0 | −1 |
| Mode c8 | 1 | 1 | −1 | −1 | 1 |
| Mode c9 | 1 | 1 | −1 | 1 | −1 |
| Mode c10 | 1 | 1 | −1 | −1 | −1 |
| Mode c11 | −1 | 1 | −1 | −1 | 0 |
| Mode c12 | −1 | 1 | −1 | 0 | −1 |
| Mode c13 | −1 | 1 | −1 | −1 | 1 |
| Mode c14 | −1 | 1 | −1 | 1 | −1 |
| Mode c15 | −1 | 1 | −1 | −1 | −1 |
| Mode c16 | 0 | 1 | −1 | −1 | 0 |
| Mode c17 | 0 | 1 | −1 | 0 | −1 |
| Mode c18 | 0 | 1 | −1 | −1 | 1 |
| Mode c19 | 0 | 1 | −1 | 1 | −1 |
| Mode c20 | 0 | 1 | −1 | −1 | −1 |
| Mode c21 | −1 | 0 | −1 | −1 | 0 |
| Mode c22 | −1 | 0 | −1 | 0 | −1 |
| Mode c23 | −1 | 0 | −1 | −1 | 1 |
| Mode c24 | −1 | 0 | −1 | 1 | −1 |
| Mode c25 | −1 | 0 | −1 | −1 | −1 |

Figure 4:
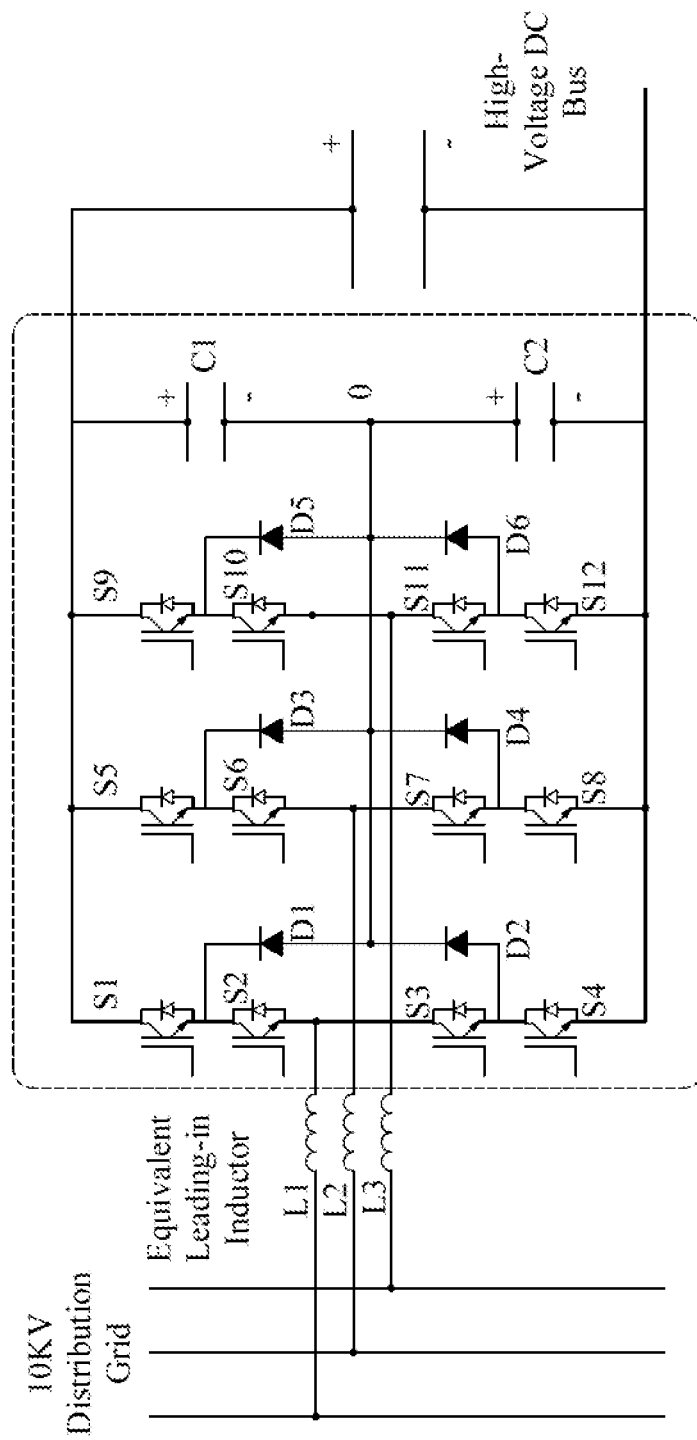
FIG. 4 is a schematic circuit diagram of the three-phase three-level bi-directional rectifying unit for one embodiment of the present invention.

The circuit 1 of the three-phase three-level bi-directional rectifying unit, as shown in FIG. 4, comprises an insulated gate bipolar transistor S1, an insulated gate bipolar transistor S2, an insulated gate bipolar transistor S3, an insulated gate bipolar transistor S4, an insulated gate bipolar transistor S5, an insulated gate bipolar transistor S6, an insulated gate bipolar transistor S7, an insulated gate bipolar transistor S8, an insulated gate bipolar transistor S9, an insulated gate bipolar transistor S10, an insulated gate bipolar transistor S11, an insulated gate bipolar transistor S12, a diode D1, a diode D2, a diode D3, a diode D4, a diode D5, a diode D6, a capacitor C1 and a capacitor C2.

A collector of the insulated gate bipolar transistor S1, a collector of the insulated gate bipolar transistor S5 and a collector of the insulated gate bipolar transistor S9 are respectively connected with a positive electrode of the low-voltage DC bus and a positive electrode of the capacitor C1; an emitter of the insulated gate bipolar transistor S4, an emitter of the insulated gate bipolar transistor S8 and an emitter of the insulated gate bipolar transistor S12 are connected with a negative electrode of the low-voltage DC bus and a negative electrode of the capacitor C2.

A collector of the insulated gate bipolar transistor S2 is connected with an emitter of the insulated gate bipolar transistor S1; an emitter of the insulated gate bipolar transistor S2 is connected with a collector of the insulated gate bipolar transistor S3; an emitter of the insulated gate bipolar transistor S3 is connected with a collector of the insulated gate bipolar transistor S4; the emitter of the insulated gate bipolar transistor S1 is also connected with a negative electrode of the diode D1; a positive electrode of the diode D1 is connected with a negative electrode of the diode D2; and a positive electrode of the diode D2 is connected with the collector of the insulated gate bipolar transistor S4.

A collector of the insulated gate bipolar transistor S6 is connected with an emitter of the insulated gate bipolar transistor S5; an emitter of the insulated gate bipolar transistor S6 is connected with a collector of the insulated gate bipolar transistor S7; an emitter of the insulated gate bipolar transistor S7 is connected with a collector of the insulated gate bipolar transistor S8; the emitter of the insulated gate bipolar transistor S5 is also connected with a negative electrode of the diode D3; a positive electrode of the diode D3 is connected with a negative electrode of the diode D4; and a positive electrode of the diode D4 is connected with a collector of the insulated gate bipolar transistor S8.

A collector of the insulated gate bipolar transistor S10 is connected with an emitter of the insulated gate bipolar transistor S9; an emitter of the insulated gate bipolar transistor S10 is connected with a collector of the insulated gate bipolar transistor S11; an emitter of the insulated gate bipolar transistor S11 is connected with a collector of the insulated gate bipolar transistor S12; the emitter of the insulated gate bipolar transistor S9 is also connected with a negative electrode of the diode D5; a positive electrode of the diode D5 is connected with a negative electrode of the diode D6; and a positive electrode of the diode D6 is connected with a collector of the insulated gate bipolar transistor S12.

The positive electrodes of the diode D1, the diode D3 and the diode D5 are also connected with a negative electrode of the capacitor C1; the positive electrode of the capacitor C1 is connected with the positive electrode of the high-voltage DC bus; the negative electrode of the capacitor C1 is also connected with a positive electrode of the capacitor C2; and the negative electrode of the capacitor C2 is connected with the negative electrode of the high-voltage DC bus.

An equivalent leading-in inductor L1 of a 10 KV distribution grid is connected with the emitter of the insulated gate bipolar transistor S2; an equivalent leading-in inductor L2 of the 10 KV distribution grid is connected with the emitter of the insulated gate bipolar transistor S6; and an equivalent leading-in inductor L3 of the 10 KV distribution grid is connected with the emitter of the insulated gate bipolar transistor S10.

Figure 5:
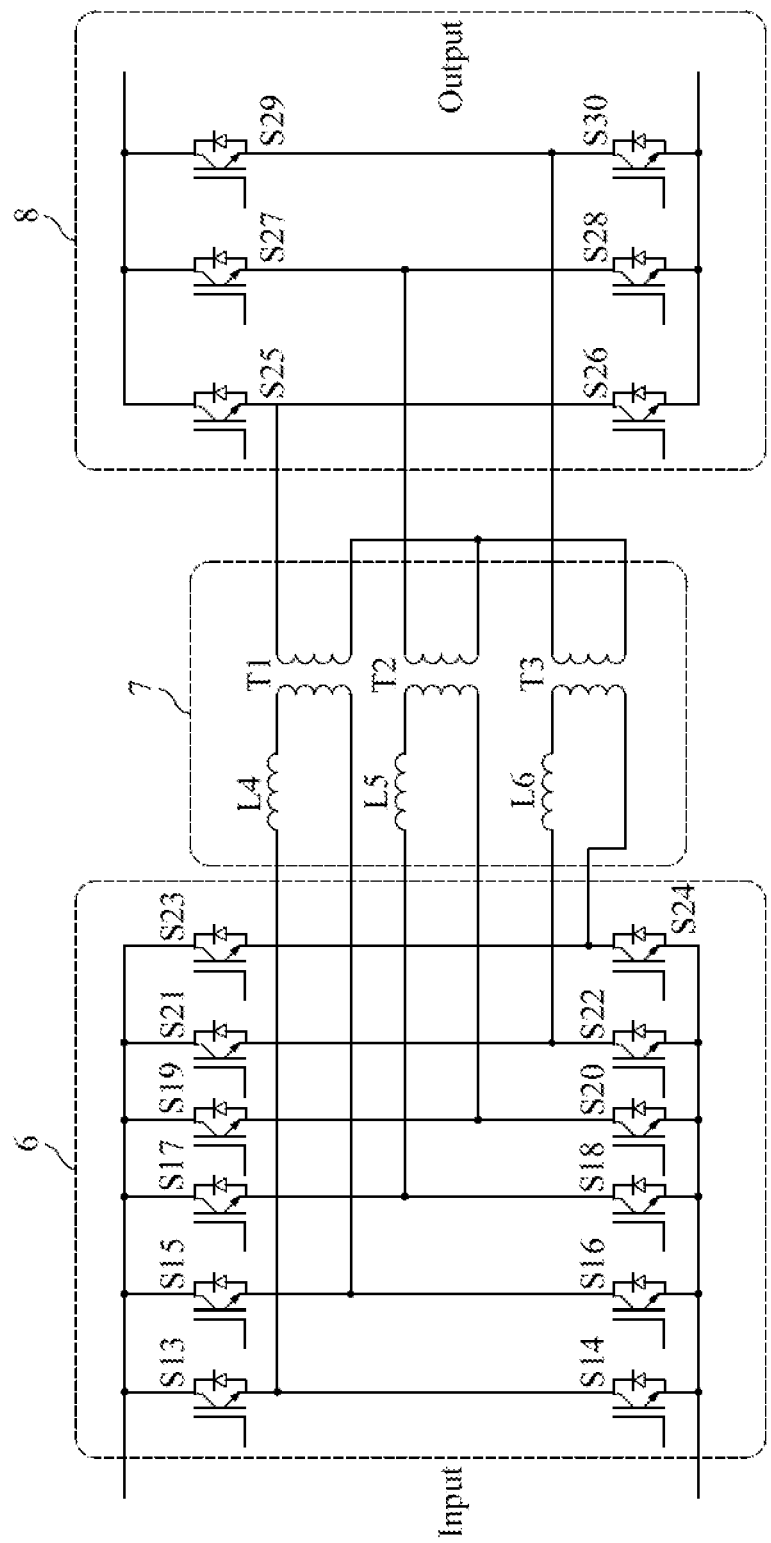
FIG. 5 is a schematic circuit diagram of the six-phase interleaved DC/DC bi-directional conversion unit for one embodiment of the present invention, wherein this figure shows a high-frequency inversion module 6, a high-frequency transformer module 7 and a rectification output module 8.

A six-phase interlaced DC/DC bi-directional conversion unit 2, as shown in FIG. 5, comprises a high-frequency inversion module 6, a high-frequency transformer module 7 and a rectification output module 8.

The input end of the high-frequency inversion module 6 is connected with the high-voltage DC bus, and the output end of the high-frequency inversion module 6 is connected to the input end of the high-frequency transformer module 7; the output end of the high-frequency transformer module 7 is connected with the input end of the rectification output module 8; and the output end of the rectification output module 8 is connected with the low-voltage DC bus.

The high-frequency inversion module 6 is used for realizing conversion between high-voltage direct current and high-voltage alternating current, and has two operating modes: inversion mode and rectification mode; when operating in the inversion mode, the high-frequency inversion module 6 is used for inverting high-voltage direct current into high-voltage alternating current; and when operating in the rectification mode, the high-frequency inversion module 6 is used for rectifying high-voltage alternating current into high-voltage direct current.

The high-frequency transformer module 7 is used for realizing conversion between high-voltage alternating current and low-voltage alternating current.

The rectification output module 8 is used for realizing conversion between low-voltage alternating current and low-voltage direct current, and has two operating modes: inversion mode and rectification mode; when operating in the rectification mode, the rectification output module 8 is used for rectifying low-voltage alternating current into low-voltage direct current; and when operating in the inversion mode, the rectification output module 8 is used for inverting low-voltage direct current into low-voltage alternating current.

The high-frequency inversion module 6 comprises an insulated gate bipolar transistor S13, an insulated gate bipolar transistor S14, an insulated gate bipolar transistor S15, an insulated gate bipolar transistor S16, an insulated gate bipolar transistor S17, an insulated gate bipolar transistor S18, an insulated gate bipolar transistor S19, an insulated gate bipolar transistor S20, an insulated gate bipolar transistor S21, an insulated gate bipolar transistor S22, an insulated gate bipolar transistor S23 and an insulated gate bipolar transistor S24.

The high-frequency transformer module 7 comprises a high-frequency transformer T1, a high-frequency transformer T2 and a high-frequency transformer T3, and also comprises an equivalent inductor L4, an equivalent inductor L5 and an equivalent inductor L6.

The rectification output module 8 comprises an insulated gate bipolar transistor S25, an insulated gate bipolar transistor S26, an insulated gate bipolar transistor S27, an insulated gate bipolar transistor S28, an insulated gate bipolar transistor S29 and an insulated gate bipolar transistor S30.

A collector of the insulated gate bipolar transistor S13, a collector of the insulated gate bipolar transistor S15, a collector of the insulated gate bipolar transistor S17, a collector of the insulated gate bipolar transistor S19, a collector of the insulated gate bipolar transistor S21 and a collector of the insulated gate bipolar transistor S23 are connected with the positive electrode of the high-voltage DC bus; an emitter of the insulated gate bipolar transistor S14, an emitter of the insulated gate bipolar transistor S16, an emitter of the insulated gate bipolar transistor S18, an emitter of the insulated gate bipolar transistor S20, an emitter of the insulated gate bipolar transistor S22 and an emitter of the insulated gate bipolar transistor S24 are connected with the negative electrode of the high-voltage DC bus; an emitter of the insulated gate bipolar transistor S13 is connected with a collector of the insulated gate bipolar transistor S14; an emitter of the insulated gate bipolar transistor S15 is connected with a collector of the insulated gate bipolar transistor S16; an emitter of the insulated gate bipolar transistor S17 is connected with a collector of the insulated gate bipolar transistor S18; an emitter of the insulated gate bipolar transistor S19 is connected with a collector of the insulated gate bipolar transistor S20; an emitter of the insulated gate bipolar transistor S21 is connected with a collector of the insulated gate bipolar transistor S22; an emitter of the insulated gate bipolar transistor S23 is connected with a collector of the insulated gate bipolar transistor S24; the emitter of the insulated gate bipolar transistor S13 is also connected with a positive electrode at the primary side of the high-frequency transformer T1 via the equivalent inductor L4; the emitter of the insulated gate bipolar transistor S15 is also connected with a negative electrode at the primary side of the high-frequency transformer T2; the emitter of the insulated gate bipolar transistor S17 is also connected with a positive electrode at the primary side of the high-frequency transformer T2 via the equivalent inductor L5; the emitter of the insulated gate bipolar transistor S19 is also connected with the negative electrode at the primary side of the high-frequency transformer T2; the emitter of the insulated gate bipolar transistor S21 is also connected with a positive electrode at the primary side of the high-frequency transformer T3 via the equivalent inductor L6; the emitter of the insulated gate bipolar transistor S23 is also connected with a negative electrode at the primary side of the high-frequency transformer T3; a collector of the insulated gate bipolar transistor S25, a collector of the insulated gate bipolar transistor S27 and a collector of the insulated gate bipolar transistor S29 are connected with a positive electrode of the low-voltage DC bus; an emitter of the insulated gate bipolar transistor S26, an emitter of the insulated gate bipolar transistor S28 and an emitter of the insulated gate bipolar transistor S30 are connected with a negative electrode of the low-voltage DC bus; an emitter of the insulated gate bipolar transistor S25 is connected with a collector of the insulated gate bipolar transistor S26; an emitter of the insulated gate bipolar transistor S27 is connected with a collector of the insulated gate bipolar transistor S28; an emitter of the insulated gate bipolar transistor S29 is connected with a collector of the insulated gate bipolar transistor S30; the emitter of the insulated gate bipolar transistor S25 is also connected with a positive electrode at the secondary side of the high-frequency transformer T1; the emitter of the insulated gate bipolar transistor S27 is also connected with a positive electrode at the secondary side of the high-frequency transformer T2; the emitter of the insulated gate bipolar transistor S29 is also connected with a positive electrode at the secondary side of the high-frequency transformer T3; and the negative electrode at the secondary side of the high-frequency transformer T1, the negative electrode at the secondary side of the high-frequency transformer T2 and the negative electrode at the secondary side of the high-frequency transformer T3 are connected.

Figure 6:
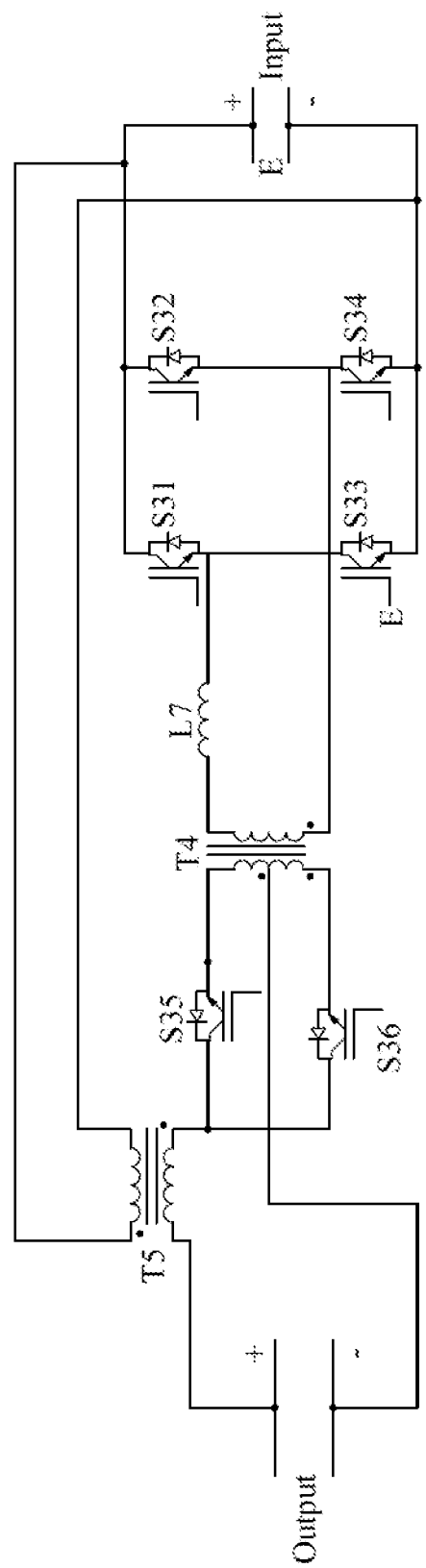
FIG. 6 is a schematic circuit diagram of the self-excitation soft start push-pull full-bridge DC/DC bi-directional conversion unit for one embodiment of the present invention.

A circuit 4 of the self-excitation soft start push-pull full-bridge DC/DC bi-directional conversion unit, as shown in FIG. 6, comprises an insulated gate bipolar transistor S31, an insulated gate bipolar transistor S32, an insulated gate bipolar transistor S33, an insulated gate bipolar transistor S34, an insulated gate bipolar transistor S35, an insulated gate bipolar transistor S36, a transformer T4, a transformer T5 and an equivalent inductor L7.

A collector of the insulated gate bipolar transistor S31 and a collector of the insulated gate bipolar transistor S32 are connected with the positive electrode of the high-voltage DC bus; an emitter of the insulated gate bipolar transistor S33 and an emitter of the insulated gate bipolar transistor S34 are connected with the negative electrode of the high-voltage DC bus; an emitter of the insulated gate bipolar transistor S31 is connected with a collector of the insulated gate bipolar transistor S33; an emitter of the insulated gate bipolar transistor S32 is connected with a collector of the insulated gate bipolar transistor S34; an emitter of the insulated gate bipolar transistor S32 is connected with a positive electrode at the primary side of the transformer T4; the emitter of the insulated gate bipolar transistor S31 is connected with a negative electrode at the primary side of the transformer T4 via the equivalent inductor L7; a first tap at the secondary side of the transformer T4 is connected with a collector of the insulated gate bipolar transistor S36; a second tap at the secondary side of the transformer T4 is connected with a 240V DC output negative electrode; a third tap at the secondary side of the transformer T4 is connected to a collector of the insulated gate bipolar transistor S35; the collector of the insulated gate bipolar transistor S35 and the collector of the insulated gate bipolar transistor S36 are connected with the positive electrode at the secondary side of the transformer T5; the negative electrode at the secondary side of the transformer T5 is connected with a 240V DC output positive electrode; the positive electrode at the primary side of the transformer T5 is connected with the positive electrode of the high-voltage DC bus; and the negative electrode at the primary side of the transformer T5 is connected with the negative electrode of the high-voltage DC bus.

Figure 7:
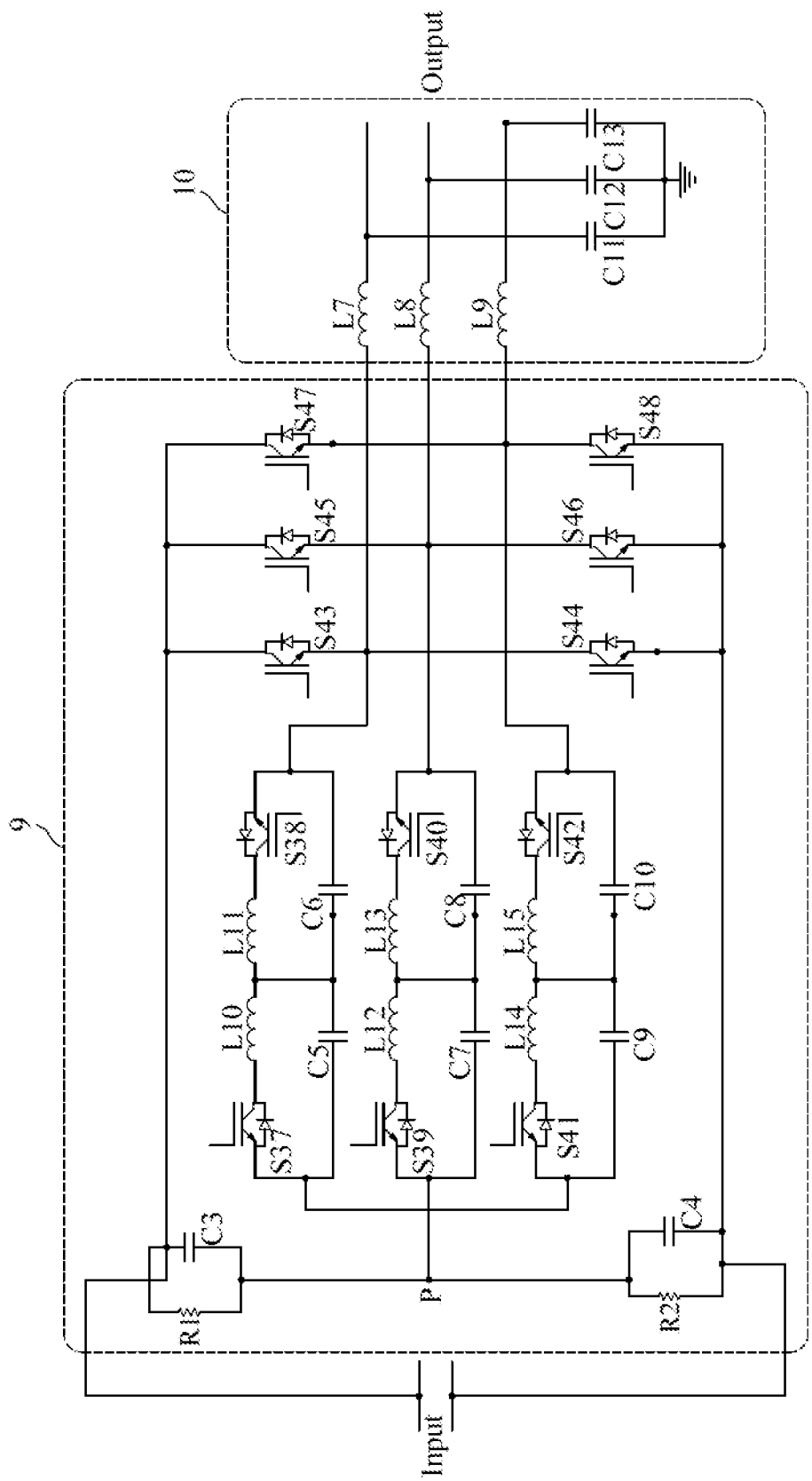
FIG. 7 is a schematic circuit diagram of the three-phase resonant soft switching bi-directional inversion unit for one embodiment of the present invention, wherein this figure shows a three-phase resonant soft switching bi-directional inverter 9 and a LC filter 10.

A circuit 5 of the three-phase resonant soft switching bi-directional inversion unit, as shown in FIG. 7, comprises a three-phase resonant soft switching bi-directional inverter 9 and an LC filter 10.

The three-phase resonant soft switching bi-directional inverter 9 comprises an insulated gate bipolar transistor S37, an insulated gate bipolar transistor S38, an insulated gate bipolar transistor S39, an insulated gate bipolar transistor S40, an insulated gate bipolar transistor S41, an insulated gate bipolar transistor S42, an insulated gate bipolar transistor S43, an insulated gate bipolar transistor S44, an insulated gate bipolar transistor S45, an insulated gate bipolar transistor S46, an insulated gate bipolar transistor S47, an insulated gate bipolar transistor S48, a resistor R1, a resistor R2, a capacitor C3, a capacitor C4, a capacitor C5, a capacitor C6, a capacitor C7, a capacitor C8, a capacitor C9, a capacitor C10, an inductor L10, an inductor L11, an inductor L12, an inductor L13, an inductor L14 and an inductor L15.

The LC filter 10 comprises an inductor L7, an inductor L8, an inductor L9, a capacitor C11, a capacitor C12 and a capacitor C13.

The resistor R1 and the capacitor C3 are connected in parallel; the resistor R2 and the capacitor C4 are connected in parallel; one connection point between the resistor R1 and the capacitor C3 is connected with the positive electrode of the low-voltage DC bus, and the other connection point between the resistor R1 and the capacitor C3 is connected with one connection point between the resistor R2 and the capacitor C4; and the other connection point between the resistor R2 and the capacitor C4 is connected with the negative electrode of the low-voltage DC bus.

In A phase, after connected with the inductor L10 in series, the collector of the insulated gate bipolar transistor S37 is connected with the capacitor C5 in parallel; the parallel connection point between the collector of the insulated gate bipolar transistor S37 and the capacitor C5 is connected to the connection point P between the resistor R1 and the resistor R2; after connected with the inductor L11 in series, the collector of the insulated gate bipolar transistor S38 is connected with the capacitor C6 in parallel; one end of the inductor L10 is connected with one end of the inductor L11; one end of the capacitor C5 is connected with one end of the capacitor C6; and the parallel connection point between the emitter of the insulated gate bipolar transistor S38 and the capacitor C6 is connected with an emitter of the insulated gate bipolar transistor S43.

In B phase, after connected with the inductor L12 in series, the collector of the insulated gate bipolar transistor S39 is connected with the capacitor C7 in parallel; the parallel connection point between the emitter of the insulated gate bipolar transistor S39 and the capacitor C7 is connected to the connection point P between the resistor R1 and the resistor R2; after connected with the inductor L13 in series, the collector of the insulated gate bipolar transistor S40 is connected with the capacitor C7 in parallel; one end of the inductor L12 is connected with one end of the inductor L13; one end of the capacitor C7 is connected with one end of the capacitor C8; and the parallel connection point between the emitter of the insulated gate bipolar transistor S40 and the capacitor C7 is connected with an emitter of the insulated gate bipolar transistor S45.

In C phase, after connected with the inductor L14 in series, the collector of the insulated gate bipolar transistor S41 is connected with the capacitor C9 in parallel; the parallel connection point between the emitter of the insulated gate bipolar transistor S41 and the capacitor C9 is connected to the connection point P between the resistor R1 and the resistor R2; after connected with the inductor L15 in series, the collector of the insulated gate bipolar transistor S42 is connected with the capacitor C10 in parallel; one end of the inductor L14 is connected with one end of the inductor L15; one end of the capacitor C9 is connected with one end of the capacitor C10; and the parallel connection point between the emitter of the insulated gate bipolar transistor S42 and the capacitor C10 is connected with the emitter of the insulated gate bipolar transistor S47.

A collector of the insulated gate bipolar transistor S43, a collector of the insulated gate bipolar transistor S45 and a collector of the insulated gate bipolar transistor S47 are connected to the positive electrode of the low-voltage DC bus; the emitter of the insulated gate bipolar transistor S43 is also connected with a collector of the insulated gate bipolar transistor S44; the emitter of the insulated gate bipolar transistor S45 is also connected with a collector of the insulated gate bipolar transistor S46; the emitter of the insulated gate bipolar transistor S47 is also connected with a collector of the insulated gate bipolar transistor S48; and an emitter of the insulated gate bipolar transistor S44, an emitter of the insulated gate bipolar transistor S46 and an emitter of the insulated gate bipolar transistor S48 are connected with the negative electrode of the low-voltage DC bus.

The emitter of the insulated gate bipolar transistor S43 is also connected with one end of the inductor L7; the emitter of the insulated gate bipolar transistor S45 is also connected with one end of the inductor L8; the emitter of the insulated gate bipolar transistor S47 is also connected with one end of the inductor L9; the other end of the inductor L7 is connected to the A phase output end of three-phase alternating current; the other end of the inductor L8 is connected to the B phase output end of three-phase alternating current; the other end of the inductor L9 is connected to the C phase output end of three-phase alternating current; one end of the capacitor C11 is connected to the A phase output end of three-phase alternating current; one end of the capacitor C12 is connected to the B phase output end of three-phase alternating current; one end of the capacitor C13 is connected to the C phase output end of three-phase alternating current; and the other end of the capacitor C11, the other end of the capacitor C12 and the other end of the capacitor C13 are earthed.

Figure 8:
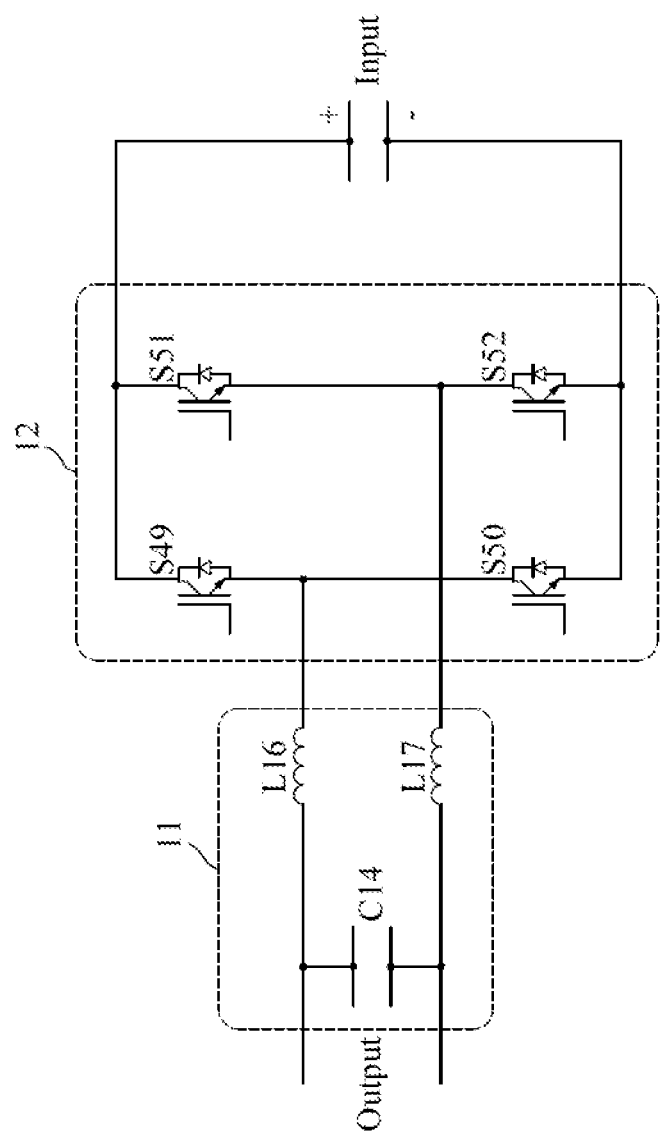
FIG. 8 is a schematic circuit diagram of the single-phase full-bridge bi-directional inversion unit for one embodiment of the present invention, wherein the figure shows a LC filter 11 and a single-phase full-bridge bi-directional inverter 12.

A circuit 3 of the single-phase full-bridge bi-directional inversion unit, as shown in FIG. 8, comprises a single-phase full-bridge bi-directional inverter 12 and an LC filter 11.

The single-phase full-bridge bi-directional inverter 12 comprises an insulated gate bipolar transistor S49, an insulated gate bipolar transistor S50, an insulated gate bipolar transistor S51 and an insulated gate bipolar transistor S52; and the LC filter 11 comprises an inductor L16, an inductor L17 and a filtering capacitor C14.

A collector of the insulated gate bipolar transistor S49 and a collector of the insulated gate bipolar transistor S51 are connected with the positive electrode of the high-voltage DC bus; an emitter of the insulated gate bipolar transistor S50 and an emitter of the insulated gate bipolar transistor S52 are connected with the negative electrode of the high-voltage DC bus; an emitter of the insulated gate bipolar transistor S49 is connected with a collector of the insulated gate bipolar transistor S50; and an emitter of the insulated gate bipolar transistor S51 is connected with a collector of the insulated gate bipolar transistor S52.

One end of the inductor L16 is connected with the emitter of the insulated gate bipolar transistor S49; one end of the inductor L17 is connected with the collector of the insulated gate bipolar transistor S52; the other end of the inductor L16 is connected with the upper output end of single-phase alternating current; the other end of the inductor L17 is connected with the lower output end of single-phase alternating current; and the filtering capacitor C14 is connected in parallel between the upper and the lower output ends of single-phase alternating current.

The LC filter used in the unit differs from a general filter, enables the sampling filtering inductance to be equivalently distributed on the positive electrode side and the negative electrode side, and has good correction effect on high distortion rate of inverter output waveform and asymmetric positive and negative half cycles.

Figure 9:
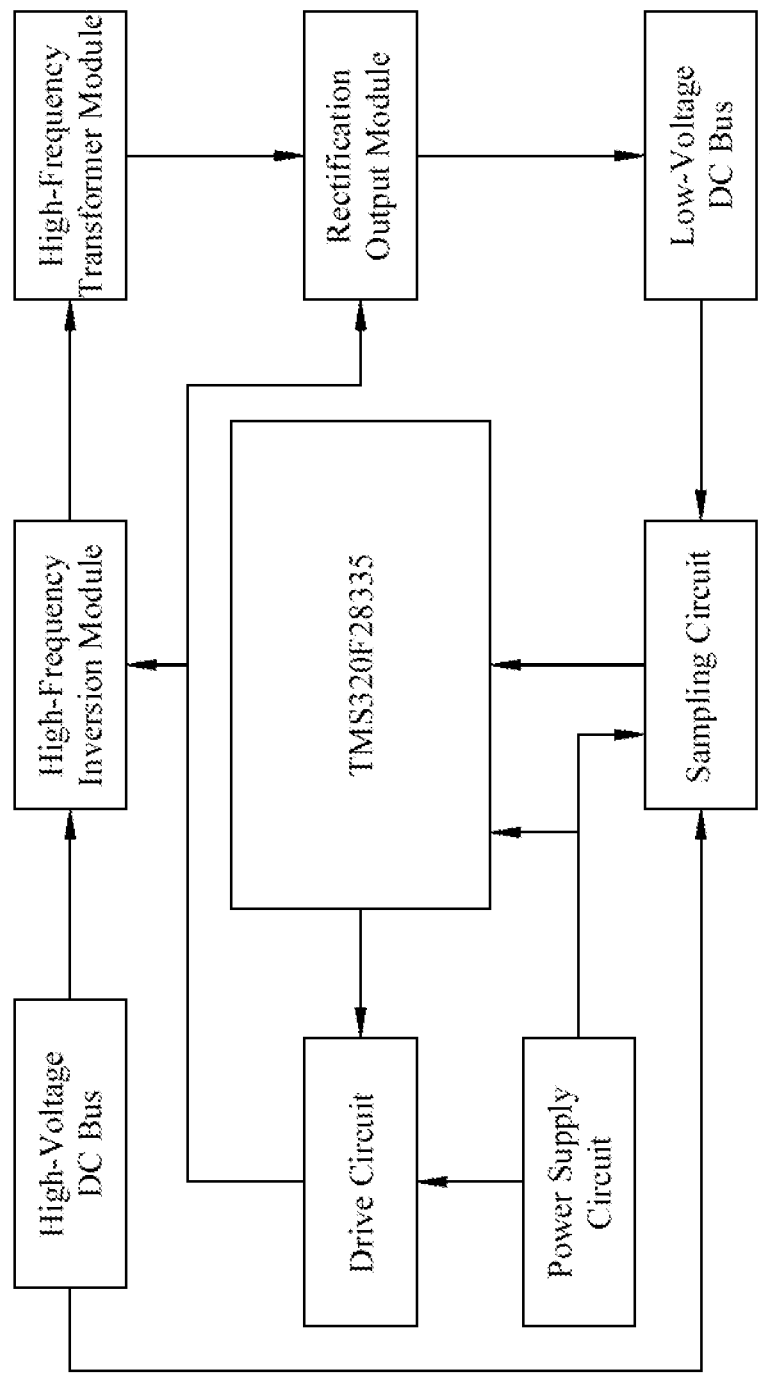
FIG. 9 is a schematic diagram of the control circuit of the six-phase interleaved DC/DC bi-directional conversion unit for one embodiment of the present invention.

A control circuit of the six-phase interleaved DC/DC bi-directional conversion unit 2, as shown in FIG. 9, comprises a DSP, a drive circuit, a power supply circuit and a sampling circuit. The model of the DSP in the embodiment is TMS320F28335.

The input end of the sampling circuit is respectively connected with the 18 KV high-voltage DC bus and the 600V low-voltage DC bus; the output end of the sampling circuit is connected with the input end of DSP TMS320F28335; the output end of DSP TMS320F28335 is connected with the input end of the drive circuit; the output end of the drive circuit is respectively connected with the high-frequency inversion module and the rectification output module of the six-phase interleaved DC/DC bi-directional conversion unit; and the power supply circuit is respectively connected to the DSP, the drive circuit and the sampling circuit.

DSP TMS320F28335 is used for generating a PWM signal for driving the insulated gate bipolar transistors of the six-phase interleaved DC/DC bi-directional conversion unit.

The drive circuit is used for amplifying the PWM signal, generated by the DSP, for driving the insulated gate bipolar transistors of the six-phase interleaved DC/DC bi-directional conversion unit for controlling the insulated gate bipolar transistors of the high-frequency inversion module and the rectification output module to be turned on or off.

The power supply circuit is used for providing electric energy for the DSP, the sampling circuit and the drive circuit.

Figure 10:
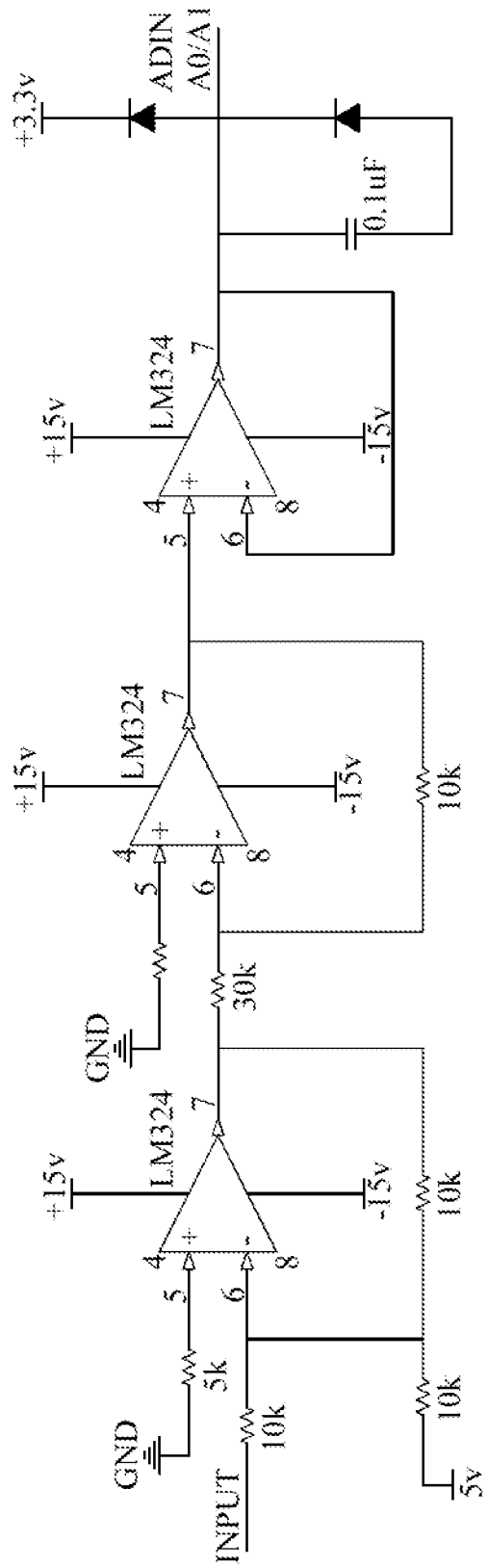
FIG. 10 is a sampling circuit diagram of the control circuit of the six-phase interleaved DC/DC bi-directional conversion unit for one embodiment of the present invention.
Figure 11:
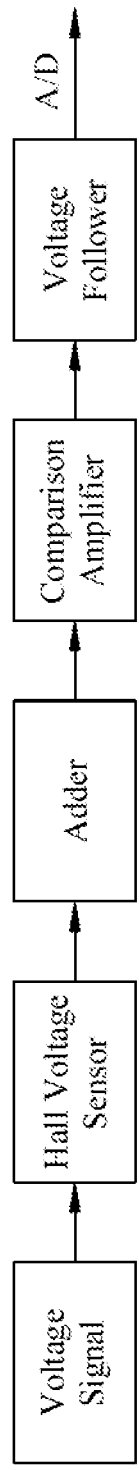
FIG. 11 is a voltage sampling schematic block diagram of the control circuit of the six-phase interleaved DC/DC bi-directional conversion unit for one embodiment of the present invention.
Figure 12:
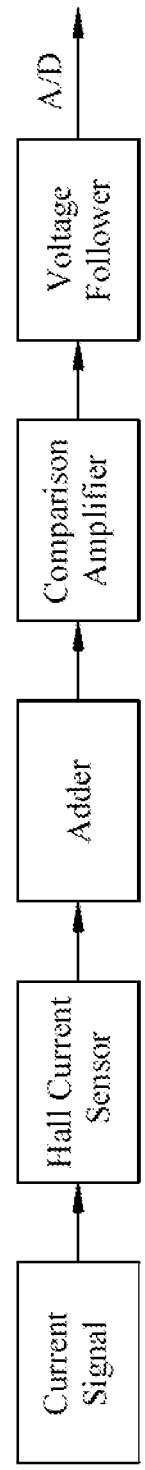
FIG. 12 is a current sampling schematic block diagram of the control circuit of the six-phase interleaved DC/DC bi-directional conversion unit for one embodiment of the present invention.

The sampling circuit, as shown in FIG. 10, is used for collecting voltage signals and current signals of the 18 KV high-voltage DC bus and voltage signals and current signals of the 600V low-voltage DC bus and transmitting the signals to DSP TMS320F28335 so as to realize that the sampling circuit composed of a circuit comprising a three-stage operational amplifier LM324 is concerned under the control of the six-phase interleaved DC/DC bi-directional conversion unit; the voltage sampling principle of the sampling circuit is shown in FIG. 11, and the current sampling principle is shown in FIG. 12; input signals at INPUT end are secondary signals obtained through transformation by Hall sensor, and are processed by an adder, a comparison amplifier and a voltage follower in sequence to obtain DSP collectable signals. The basic principle is that linear transformation is performed on input voltage and current signals via the Hall sensor and the signals are converted into nonnegative signals via the adder; the signals are amplified to the range of 0V to 3V via the comparison amplifier and then isolated via the voltage follower; and output signals are sent to the DSP for AD collection.

Figure 13A:
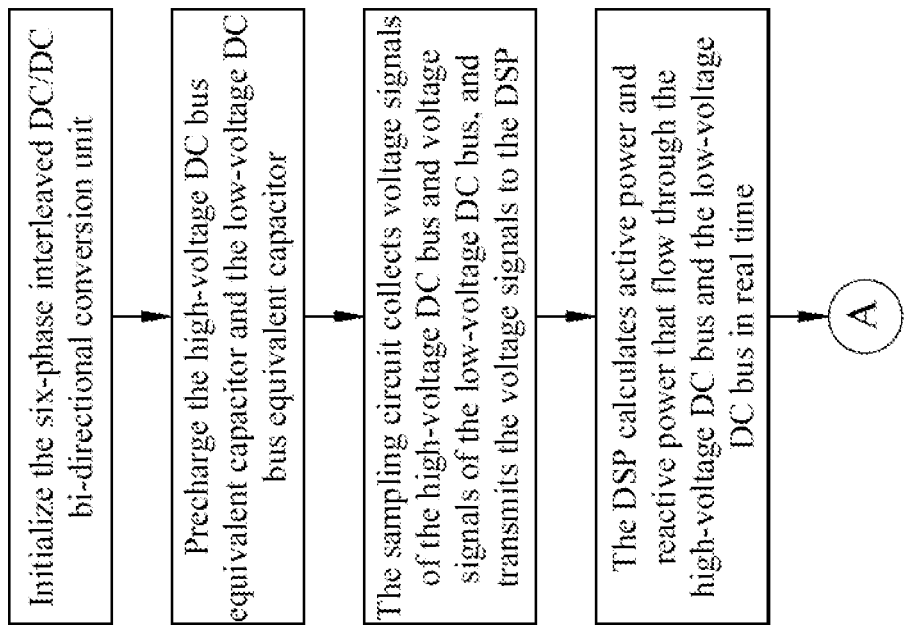
FIGS. 13A, 13B and 13C are a control flow chart of the six-phase interleaved DC/DC bi-directional conversion unit for one embodiment of the present invention.
Figure 13B:
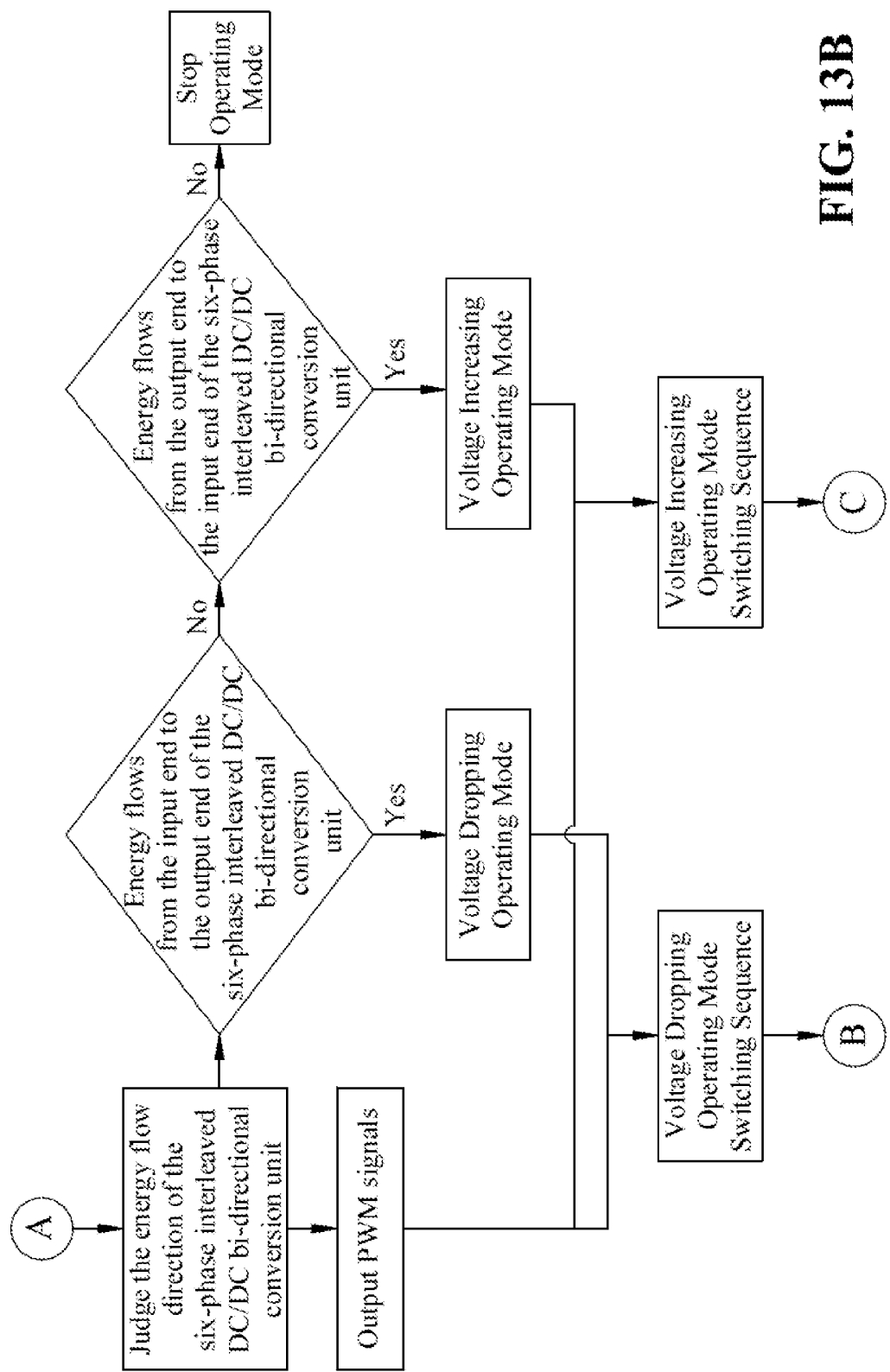
Figure 13C:
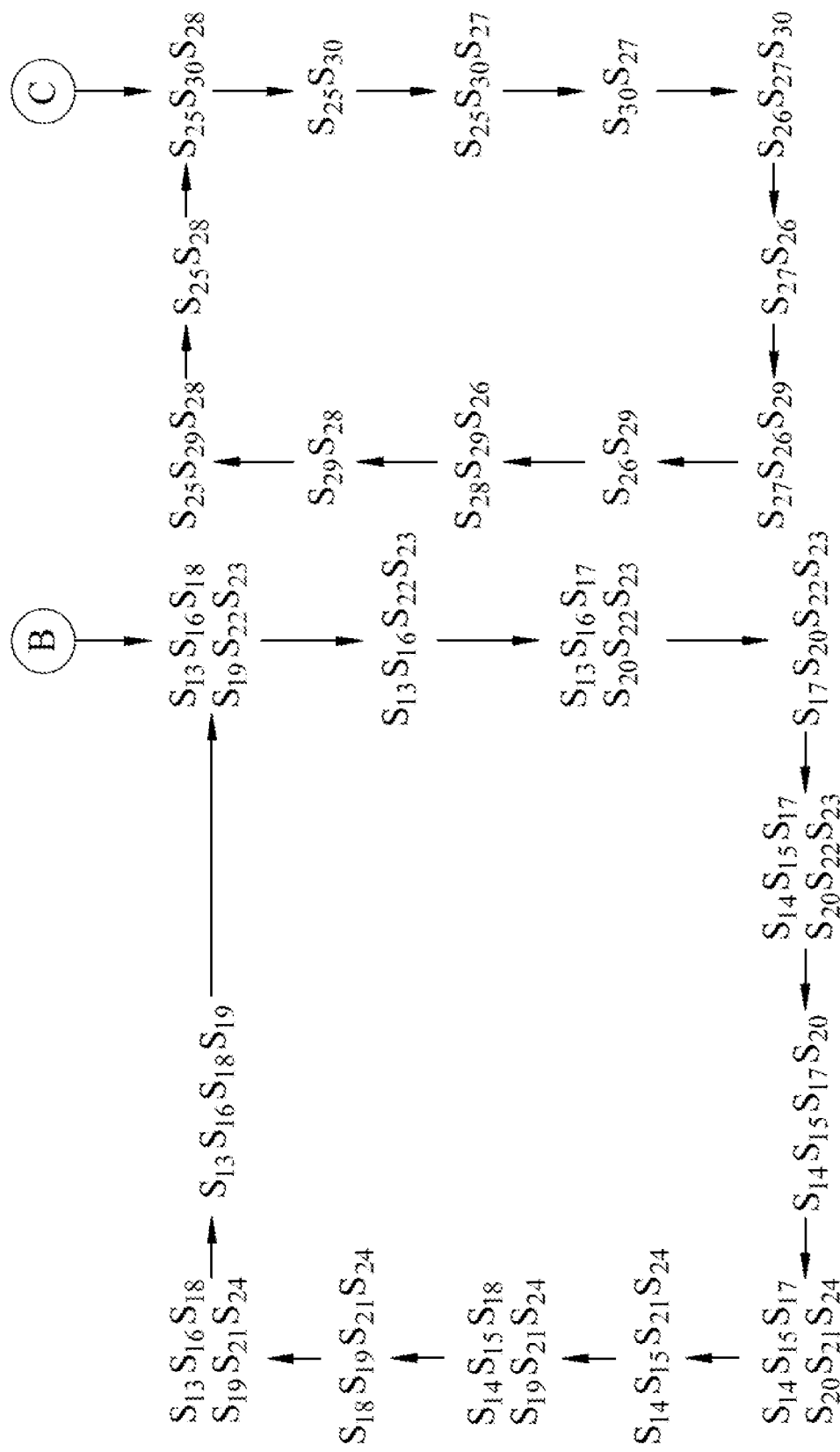

A control method of the six-phase interleaved DC/DC bi-directional conversion unit, as shown in FIGS. 13A, 13B and 13C, comprises the following steps:

Step 1: Initializing the six-phase interleaved DC/DC bi-directional conversion unit and precharging the high-voltage DC bus equivalent capacitor and the low-voltage DC bus equivalent capacitor.

Step 2: The sampling circuit collecting voltage signals of the high-voltage DC bus and voltage signals of the low-voltage DC bus and transmitting the voltage signals to the DSP.

Step 3: The DSP calculating active power and reactive power that flow through the high-voltage DC bus and the low-voltage DC bus in real time; judging the energy flow direction of the six-phase interleaved DC/DC bi-directional conversion unit; outputting a PWM signal to the drive circuit; if energy flows from the input end to the output end of the six-phase interleaved DC/DC bi-directional conversion unit, the six-phase interleaved DC/DC bi-directional conversion unit operating in a voltage dropping operating mode and executing Step 4; if the energy flows from the output end to the input end of the six-phase interleaved DC/DC bi-directional conversion unit, the six-phase interleaved DC/DC bi-directional conversion unit operating in a voltage increasing operating mode and executing Step 5; if no energy flows through the six-phase interleaved DC/DC bi-directional conversion unit, the six-phase interleaved DC/DC bi-directional conversion unit being in a stop mode.

Step 4: The six-phase interleaved DC/DC bi-directional conversion unit operating in the voltage dropping operating mode; the high-frequency inversion module of the six-phase interleaved DC/DC bi-directional conversion unit operating by different operating modes; the rectification output module being in a natural rectification state.

With respect to the voltage dropping operating mode, that is, the energy flows from the input end to the output end of the six-phase interleaved DC/DC bi-directional conversion unit, in the operating state, the high-frequency inversion module at the primary side of the high-frequency transformer is used for inversion function, the rectification output module is used for uncontrolled rectification function and the rectification output module is used as an uncontrolled rectification device by the anti-parallel diode of each insulated gate bipolar transistor.

Step 4.1: Turning on the insulated gate bipolar transistor S13, the insulated gate bipolar transistor S16, the insulated gate bipolar transistor S18, the insulated gate bipolar transistor S19, the insulated gate bipolar transistor S22 and the insulated gate bipolar transistor S23 and executing Step 4.2 over a period of time.

Step 4.2: Turning on the insulated gate bipolar transistor S13, the insulated gate bipolar transistor S16, the insulated gate bipolar transistor S22 and the insulated gate bipolar transistor S23 and executing Step 4.3 over a period of time.

Step 4.3: Turning on the insulated gate bipolar transistor S13, the insulated gate bipolar transistor S16, the insulated gate bipolar transistor S17, the insulated gate bipolar transistor S20, the insulated gate bipolar transistor S22 and the insulated gate bipolar transistor S23 and executing Step 4.4 over a period of time.

Step 4.4: Turning on the insulated gate bipolar transistor S17, the insulated gate bipolar transistor S20, the insulated gate bipolar transistor S22 and the insulated gate bipolar transistor S23 and executing Step 4.5 over a period of time.

Step 4.5: Turning on the insulated gate bipolar transistor S14, the insulated gate bipolar transistor S15, the insulated gate bipolar transistor S17, the insulated gate bipolar transistor S20, the insulated gate bipolar transistor S22 and the insulated gate bipolar transistor S23 and executing Step 4.6 over a period of time.

Step 4.6: Turning on the insulated gate bipolar transistor S14, the insulated gate bipolar transistor S15, the insulated gate bipolar transistor S17 and the insulated gate bipolar transistor S20 and executing Step 4.7 over a period of time.

Step 4.7: Turning on the insulated gate bipolar transistor S14, the insulated gate bipolar transistor S15, the insulated gate bipolar transistor S17, the insulated gate bipolar transistor S20, the insulated gate bipolar transistor S21 and the insulated gate bipolar transistor S24 and executing Step 4.8 over a period of time.

Step 4.8: Turning on the insulated gate bipolar transistor S14, the insulated gate bipolar transistor S15, the insulated gate bipolar transistor S21 and the insulated gate bipolar transistor S24 and executing Step 4.9 over a period of time.

Step 4.9: Turning on the insulated gate bipolar transistor S14, the insulated gate bipolar transistor S15, the insulated gate bipolar transistor S18, the insulated gate bipolar transistor S19, the insulated gate bipolar transistor S21 and the insulated gate bipolar transistor S24 and executing Step 4.10 over a period of time.

Step 4.10: Turning on the insulated gate bipolar transistor S18, the insulated gate bipolar transistor S19, the insulated gate bipolar transistor S21 and the insulated gate bipolar transistor S24 and executing Step 4.11 over a period of time.

Step 4.11: Turning on the insulated gate bipolar transistor S13, the insulated gate bipolar transistor S16, the insulated gate bipolar transistor S18, the insulated gate bipolar transistor S19, the insulated gate bipolar transistor S21 and the insulated gate bipolar transistor S24 and executing Step 4.12 over a period of time.

Step 4.12: Turning on the insulated gate bipolar transistor S13, the insulated gate bipolar transistor S16, the insulated gate bipolar transistor S18 and the insulated gate bipolar transistor S19 and return to Step 4.1 over a period of time.

Step 5: The six-phase interleaved DC/DC bi-directional conversion unit operating in the voltage increasing operating mode; the rectification output module of the six-phase interleaved DC/DC bi-directional conversion unit operating by different operating modes; the high-frequency inversion module being in a natural rectification state.

With respect to the voltage increasing operating mode, that is, the energy flows from the output end to the input end of the six-phase interleaved DC/DC bi-directional conversion unit, in the operating state, the high-frequency inversion module at the primary side of the high-frequency transformer is used for rectification function, and the rectification output module is used for inversion function; the switching order of each insulated gate bipolar transistor of the rectification output module is controlled in the following steps; the high-frequency inversion module is used as an uncontrolled rectification device by the anti-parallel diode of each insulated gate bipolar transistor and the energy flows through the high-frequency inversion module.

Step 5.1: Turning on the insulated gate bipolar transistor S25, the insulated gate bipolar transistor S28 and the insulated gate bipolar transistor S30 and executing Step 5.2 over a period of time.

Step 5.2: Turning on the insulated gate bipolar transistor S25 and the insulated gate bipolar transistor S30 and executing Step 5.3 over a period of time.

Step 5.3: Turning on the insulated gate bipolar transistor S25, the insulated gate bipolar transistor S30 and the insulated gate bipolar transistor S27 and executing Step 5.4 over a period of time.

Step 5.4: Turning on the insulated gate bipolar transistor S30 and the insulated gate bipolar transistor S27 and executing Step 5.5 over a period of time.

Step 5.5: Turning on the insulated gate bipolar transistor S30, the insulated gate bipolar transistor S26 and the insulated gate bipolar transistor S27 and executing Step 5.6 over a period of time.

Step 5.6: Turning on the insulated gate bipolar transistor S26 and the insulated gate bipolar transistor S27 and executing Step 5.7 over a period of time.

Step 5.7: Turning on the insulated gate bipolar transistor S26, the insulated gate bipolar transistor S29 and the insulated gate bipolar transistor S27 and executing Step 5.8 over a period of time.

Step 5.8: Turning on the insulated gate bipolar transistor S26 and the insulated gate bipolar transistor S29 and executing Step 5.9 over a period of time.

Step 5.9: Turning on the insulated gate bipolar transistor S26, the insulated gate bipolar transistor S29 and the insulated gate bipolar transistor S28 and executing Step 5.10 over a period of time.

Step 5.10: Turning on the insulated gate bipolar transistor S29 and the insulated gate bipolar transistor S28 and executing Step 5.11 over a period of time.

Step 5.11: Turning on the insulated gate bipolar transistor S25, the insulated gate bipolar transistor S29 and the insulated gate bipolar transistor S28 and executing Step 5.12 over a period of time.

Step 5.12: Turning on the insulated gate bipolar transistor S25 and the insulated gate bipolar transistor S28 and returning to Step 5.1 over a period of time.

What is claimed is:

1. An energy router for an energy internet, comprising a three-phase three-level bi-directional rectifying unit; a six-phase interleaved DC/DC bi-directional conversion unit; a self-excitation soft start push-pull full-bridge DC/DC bi-directional conversion unit; a three-phase resonant soft switching bi-directional inversion unit; a single-phase full-bridge bi-directional inversion unit; a high-voltage DC bus and a low-voltage DC bus, wherein an input end of the three-phase three-level bi-directional rectifying unit is connected to a 10 KV distribution grid; an output end of the three-phase three-level bi-directional rectifying unit is connected with the high-voltage DC bus; input ends of the self-excitation soft start push-pull full-bridge DC/DC bi-directional conversion unit and the six-phase interleaved DC/DC bi-directional conversion unit are respectively connected with the high-voltage DC bus; an output end of the self-excitation soft start push-pull full-bridge DC/DC bi-directional conversion unit is connected with a DC load, a distributed DC power generating device or a first energy storage device; an output end of the six-phase interleaved DC/DC bi-directional conversion unit is connected with the low-voltage DC bus; input ends of the three-phase resonant soft switching bi-directional inversion unit and the single-phase full-bridge bi-directional inversion unit are connected with the low-voltage DC bus; an output end of the three-phase resonant soft switching bi-directional inversion unit is connected with a three-phase AC load, a distributed three-phase AC power generating device or a second energy storage device; an output end of the single-phase full-bridge bi-directional inversion unit is connected with a single-phase AC load, a distributed single-phase AC power generating device or a third energy storage device, wherein the three-phase three-level bi-directional rectifying unit is used for realizing power conversion between the 10 KV distribution grid and high-voltage direct current to operate in the rectification operating mode or inversion operating mode, wherein the six-phase interleaved DC/DC bi-directional conversion unit is used for realizing power conversion between high-voltage direct current and low-voltage direct current to operate in the voltage increasing operating mode or voltage dropping operating mode, wherein the self-excitation soft start push-pull full-bridge DC/DC bi-directional conversion unit is used for realizing conversion between high-voltage direct current and 240V direct current to operate in the voltage increasing operating mode or voltage dropping operating mode, and supplying appropriate direct current to the distributed DC power generating device, the DC load or the first energy storage device, wherein the three-phase resonant soft switching bi-directional inversion unit is used for realizing conversion between low-voltage direct current and 380V, 50 HZ alternating current to operate in the rectification operating mode or inversion operating mode, wherein the single-phase full-bridge bi-directional inversion unit is used for realizing conversion between low-voltage direct current and 220V, 50 HZ alternating current to operate in the rectification operating mode or inversion operating mode, wherein the high-voltage DC bus is used for stabilizing the output voltage of the three-phase three-level bi-directional rectifying unit, the input voltage of the six-phase interleaved DC/DC bi-directional conversion unit and the input voltage of the self-excitation soft start push-pull full-bridge DC/DC bi-directional conversion unit, wherein the low-voltage DC bus is used for stabilizing the output voltage of the six-phase interleaved DC/DC bi-directional conversion unit, the input voltage of the three-phase resonant soft switching bi-directional inversion unit and the input voltage of the single-phase full-bridge bi-directional inversion unit.

2. The energy router for an energy internet of claim 1, wherein the three-phase three-level bi-directional rectifying unit, the six-phase interleaved DC/DC bi-directional conversion unit, the self-excitation soft start push-pull full-bridge DC/DC bi-directional conversion unit, the three-phase resonant soft switching bi-directional inversion unit and the single-phase full-bridge bi-directional inversion unit each have three energy flow operating modes: forward conduction, reverse conduction and non-conduction, wherein, energy flow from the input end to the output end is called forward conduction, energy flow from the output end to the input end is called reverse conduction, and no energy flow is called non-conduction; according to the energy flow operating mode of each unit, different operating modes for the energy router for the energy internet are formed.

3. The energy router for an energy internet of claim 1, wherein the six-phase interleaved DC/DC bi-directional conversion unit comprises a high-frequency inversion module, a high-frequency transformer module and a rectification output module, wherein the input end of the high-frequency inversion module is connected with the high-voltage DC bus, and the output end of the high-frequency inversion module is connected with the input end of the high-frequency transformer module; the output end of the high-frequency transformer module is connected with the input end of the rectification output module; the output end of the rectification output module is connected with the low-voltage DC bus, wherein the high-frequency inversion module is used for realizing conversion between high-voltage direct current and high-voltage alternating current, and has two operating modes: inversion mode and rectification mode; when operating in the inversion mode, the high-frequency inversion module is used for inverting high-voltage direct current into high-voltage alternating current; and when operating in the rectification mode, the high-frequency inversion module is used for rectifying high-voltage alternating current into high-voltage direct current, wherein the high-frequency transformer module is used for realizing conversion between high-voltage alternating current and low-voltage alternating current, wherein the rectification output module is used for realizing conversion between low-voltage alternating current and low-voltage direct current, and has two operating modes: inversion mode and rectification mode; when operating in the rectification mode, the rectification output module is used for rectifying low-voltage alternating current into low-voltage direct current; and when operating in the inversion mode, the rectification output module is used for inverting low-voltage direct current into low-voltage alternating current.

4. The energy router for an energy internet of claim 3, wherein a control circuit of the six-phase interleaved DC/DC bi-directional conversion unit comprises a DSP; a drive circuit; a power supply circuit and a sampling circuit, wherein the input end of the sampling circuit is respectively connected with the high-voltage DC bus and the low-voltage DC bus; the output end of the sampling circuit is connected with the input end of the DSP; the output end of the DSP is connected with the input end of the drive circuit; the output end of the drive circuit is respectively connected with the high-frequency inversion module and the rectification output module of the six-phase interleaved DC/DC bi-directional conversion unit; the power supply circuit is respectively connected to the DSP, the drive circuit and the sampling circuit, wherein the DSP is used for generating PWM signals driving the insulated gate bipolar transistor of the six-phase interleaved DC/DC bi-directional conversion unit, wherein the drive circuit is used for amplifying PWM signals which are generated by the DSP to drive the insulated gate bipolar transistor of the six-phase interleaved DC/DC bi-directional conversion unit to control on-off of insulated gate bipolar transistors of the high-frequency inversion module and the rectification output module, wherein the power supply circuit is used for supplying electric energy to the DSP, the sampling circuit and the drive circuit, wherein the sampling circuit is used for collecting voltage signals and current signals of the high-voltage DC bus and voltage signals and current signals of the low-voltage DC bus and transmitting these signals to the DSP.

5. The energy router for an enemy internet of claim 3, wherein the six-phase interleaved DC/DC bi-directional conversion unit is controlled by a method comprising the following steps:

Step 1: Initializing the six-phase interleaved DC/DC bi-directional conversion unit, and precharging the high-voltage DC bus equivalent capacitor and the low-voltage DC bus equivalent capacitor;

Step 2: The sampling circuit collecting voltage signals of the high-voltage DC bus and voltage signals of the low-voltage DC bus, and transmitting the voltage signals to the DSP;

Step 3: The DSP calculating active power and reactive power that flow through the high-voltage DC bus and the low-voltage DC bus in real time; judging the energy flow direction of the six-phase interleaved DC/DC bi-directional conversion unit; outputting a PWM signal to the drive circuit; if energy flows from the input end to the output end of the six-phase interleaved DC/DC bi-directional conversion unit, the six-phase interleaved DC/DC bi-directional conversion unit operating in a voltage dropping operating mode and executing Step 4; if energy flows from the output end to the input end of the six-phase interleaved DC/DC bi-directional conversion unit, the six-phase interleaved DC/DC bi-directional conversion unit operating in a voltage increasing operating mode and executing Step 5; if no energy flows through the six-phase interleaved DC/DC bi-directional conversion unit, the six-phase interleaved DC/DC bi-directional conversion unit being in a stop mode;

Step 4: The six-phase interleaved DC/DC bi-directional conversion unit operating in the voltage dropping operating mode; the high-frequency inversion module of the six-phase interleaved DC/DC bi-directional conversion unit operating by different operating modes; the rectification output module being in a natural rectification state; and Step 5: The six-phase interleaved DC/DC bi-directional conversion unit operating in the voltage increasing operating mode; the rectification output module of the six-phase interleaved DC/DC bi-directional conversion unit operating by different operating modes; the high-frequency inversion module being in a natural rectification state.

* * * * *